(12) United States Patent
Elberbaum

(10) Patent No.: US 6,268,882 B1
(45) Date of Patent: Jul. 31, 2001

(54) DOME SHAPED CAMERA WITH SIMPLIFIED CONSTRUCTION AND POSITIONING

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 09/224,473

(22) Filed: Dec. 31, 1998

(51) Int. Cl.[7] ....................................................... H04N 7/18
(52) U.S. Cl. ............................................ 348/151; 348/143
(58) Field of Search .................................... 348/143, 151, 348/152

(56) References Cited

U.S. PATENT DOCUMENTS 5,153,623 * 10/1992 Bouvier .................................. 396/427
5,818,519 * 10/1998 Wren ..................................... 348/151
5,852,754 * 12/1998 Schneider ............................. 396/427

* cited by examiner

*Primary Examiner*—Vu Le
(74) *Attorney, Agent, or Firm*—Helfgott & Karas, PC.

(57) ABSTRACT

A television camera apparatus for surveillance applications includes a television camera having a base plate to be attached to a supporting structure, a camera holder fixed to the base plate and a camera body protruding from the camera holder. The camera body includes two antipodal segments spaced from each other and fixedly attached to the camera holder and having chord planes facing to and parallel to each other and a central segment disposed between the antipodal segments and having a shape of an arcuated drum having two sides parallel to each other and a thickness slightly smaller than the distance between the chord planes of the two antipodal segments facing each other. The central segment houses a picture pickup element, a lens and a lens pane which has a curvature surface of a diameter equal to that of the central segment so that the television camera looks like a dome-shaped television camera.

46 Claims, 31 Drawing Sheets

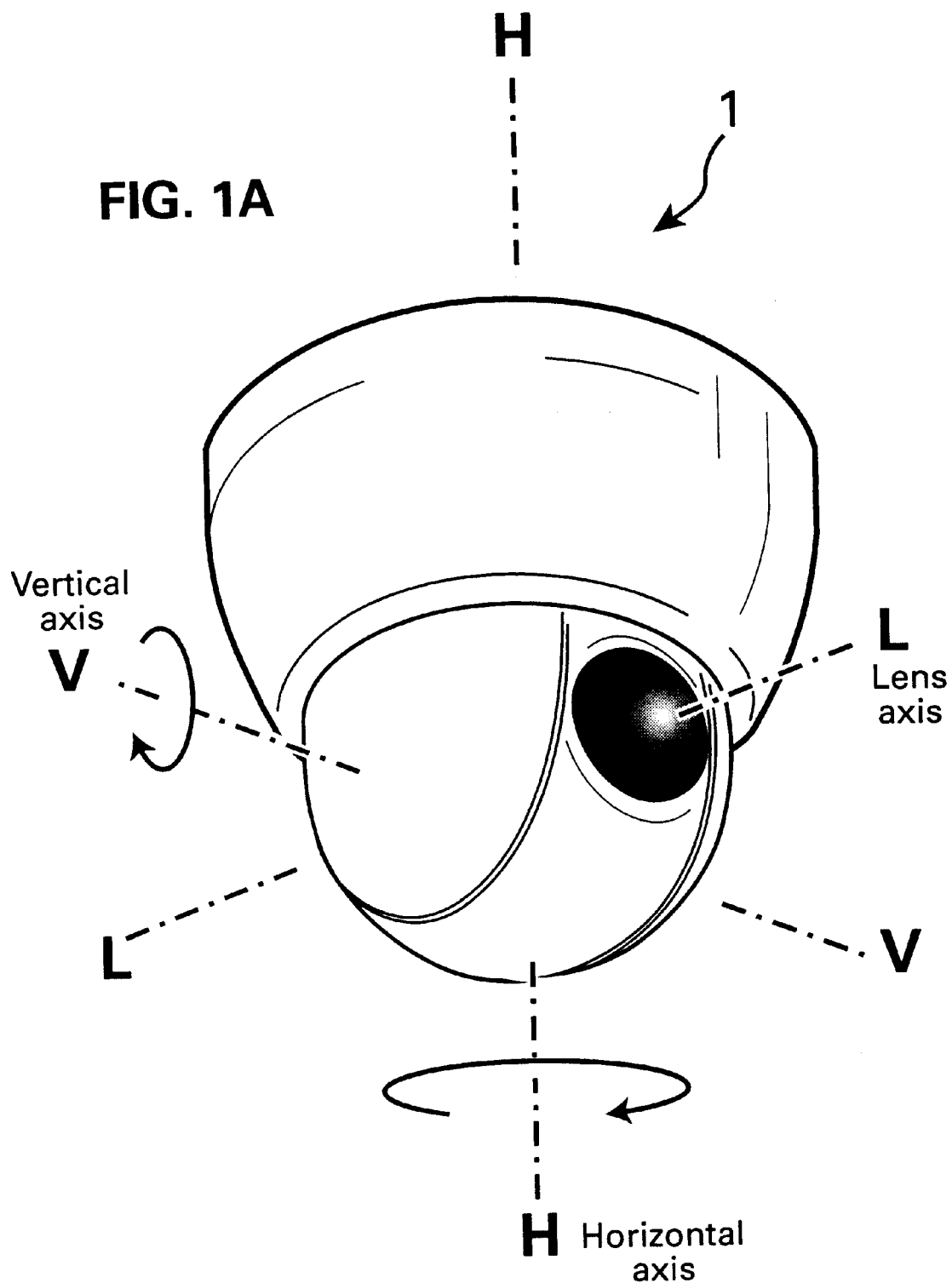

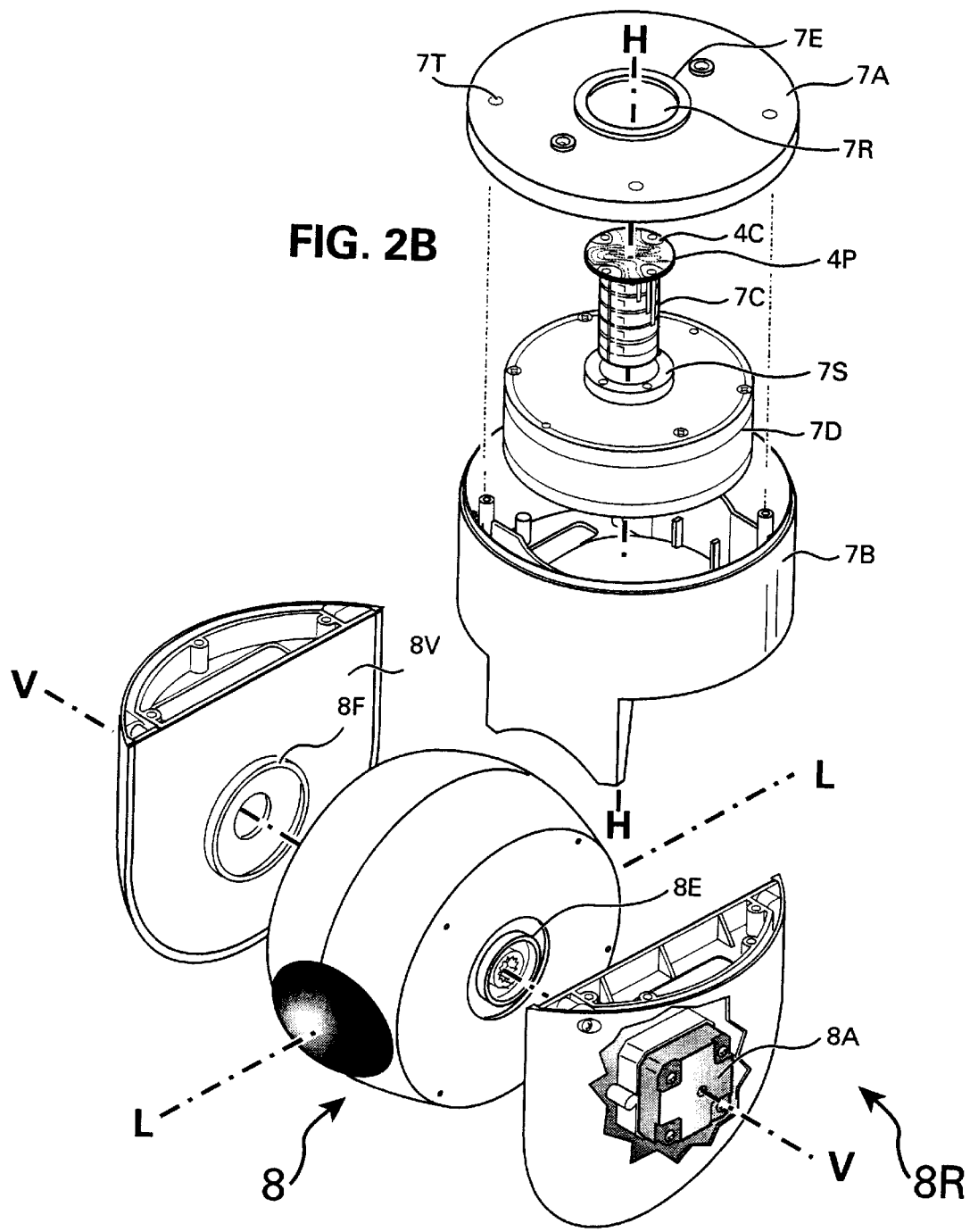

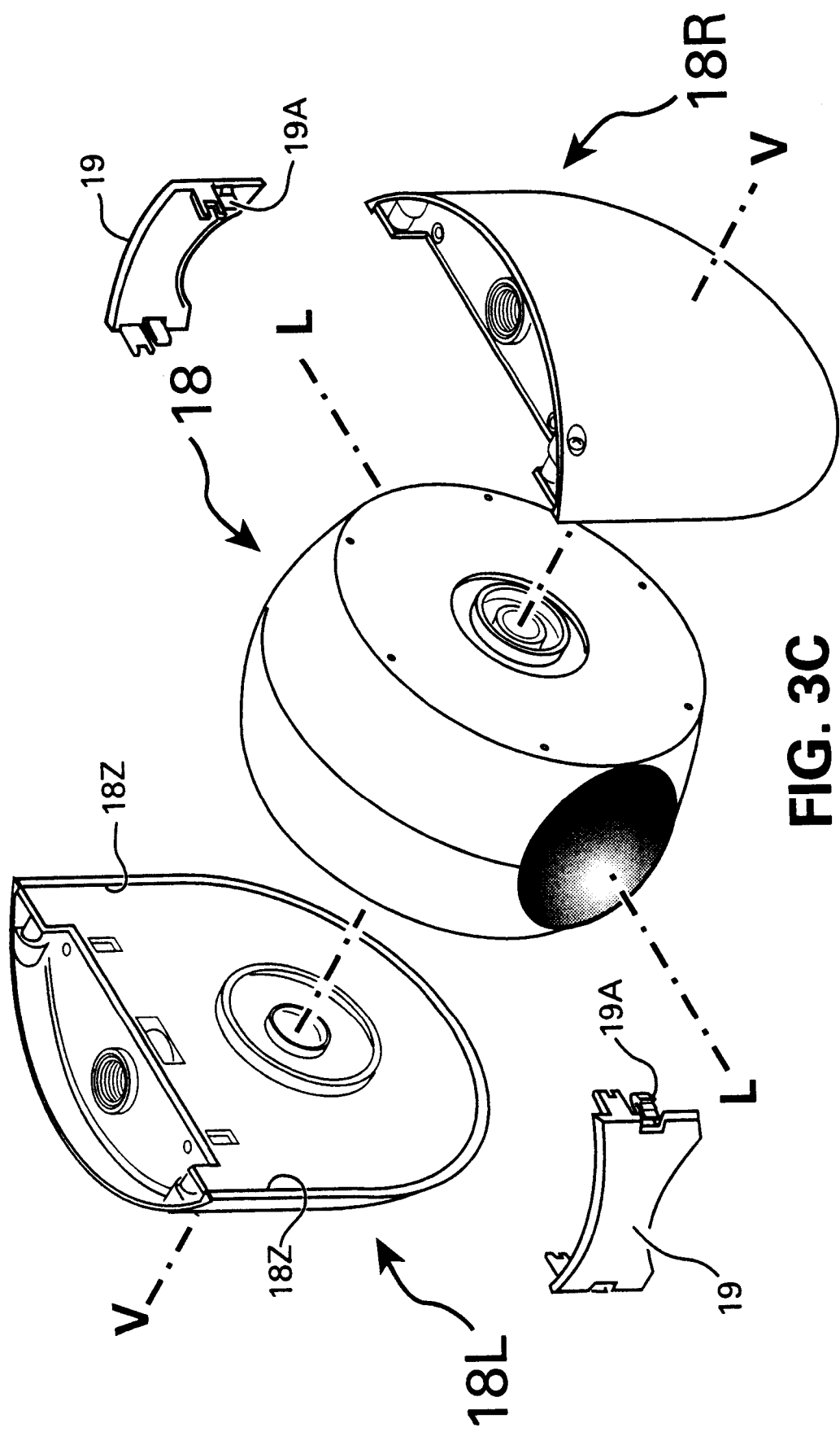

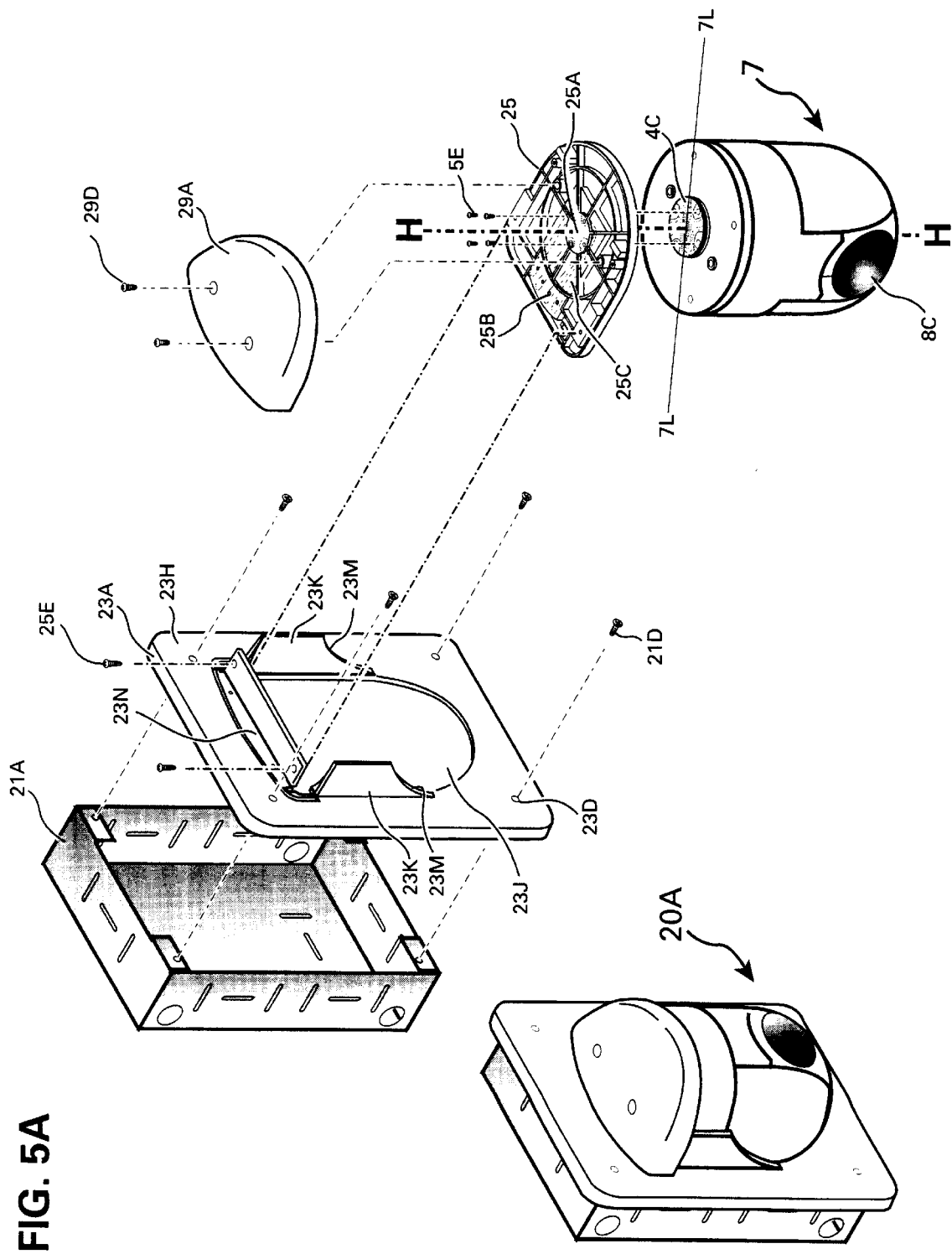

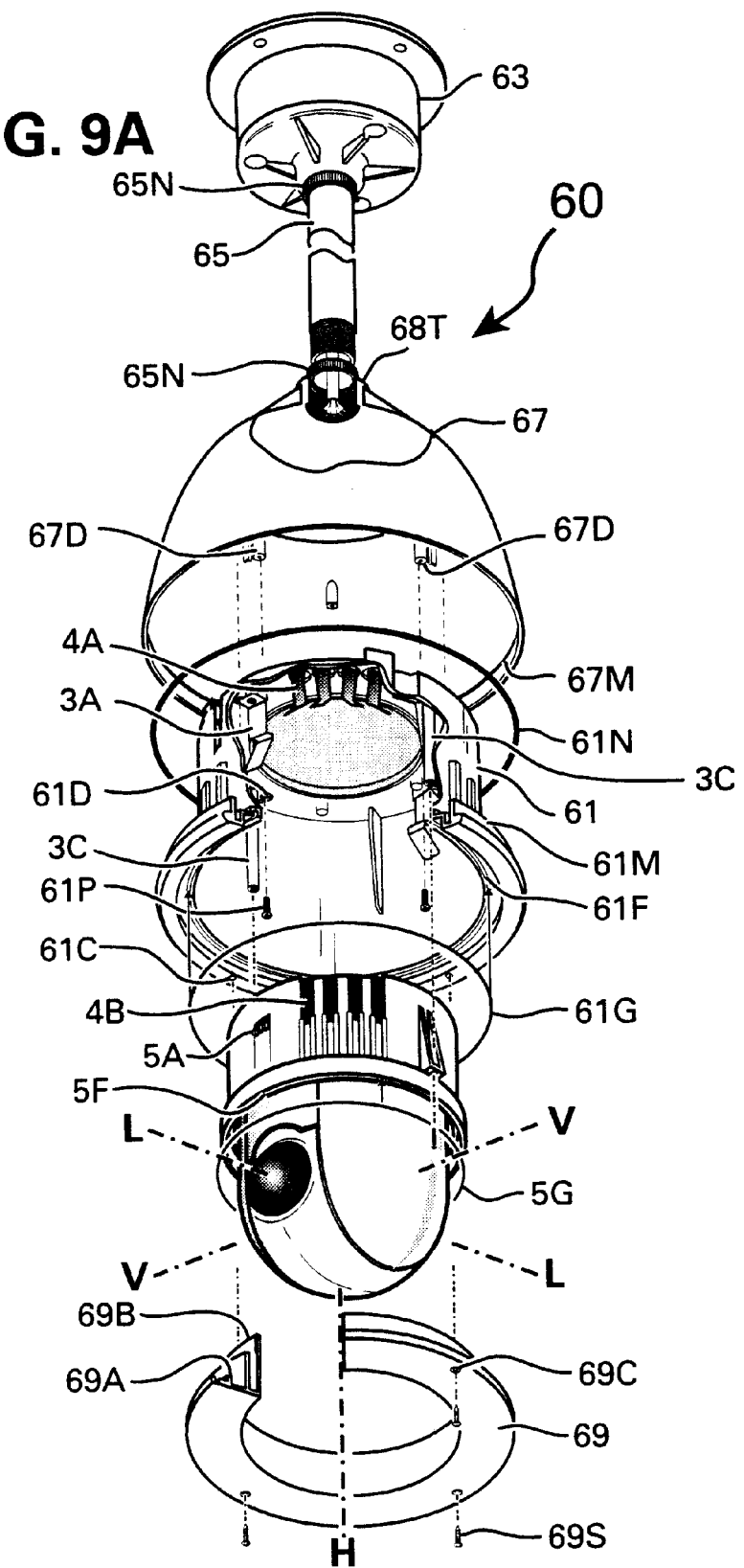

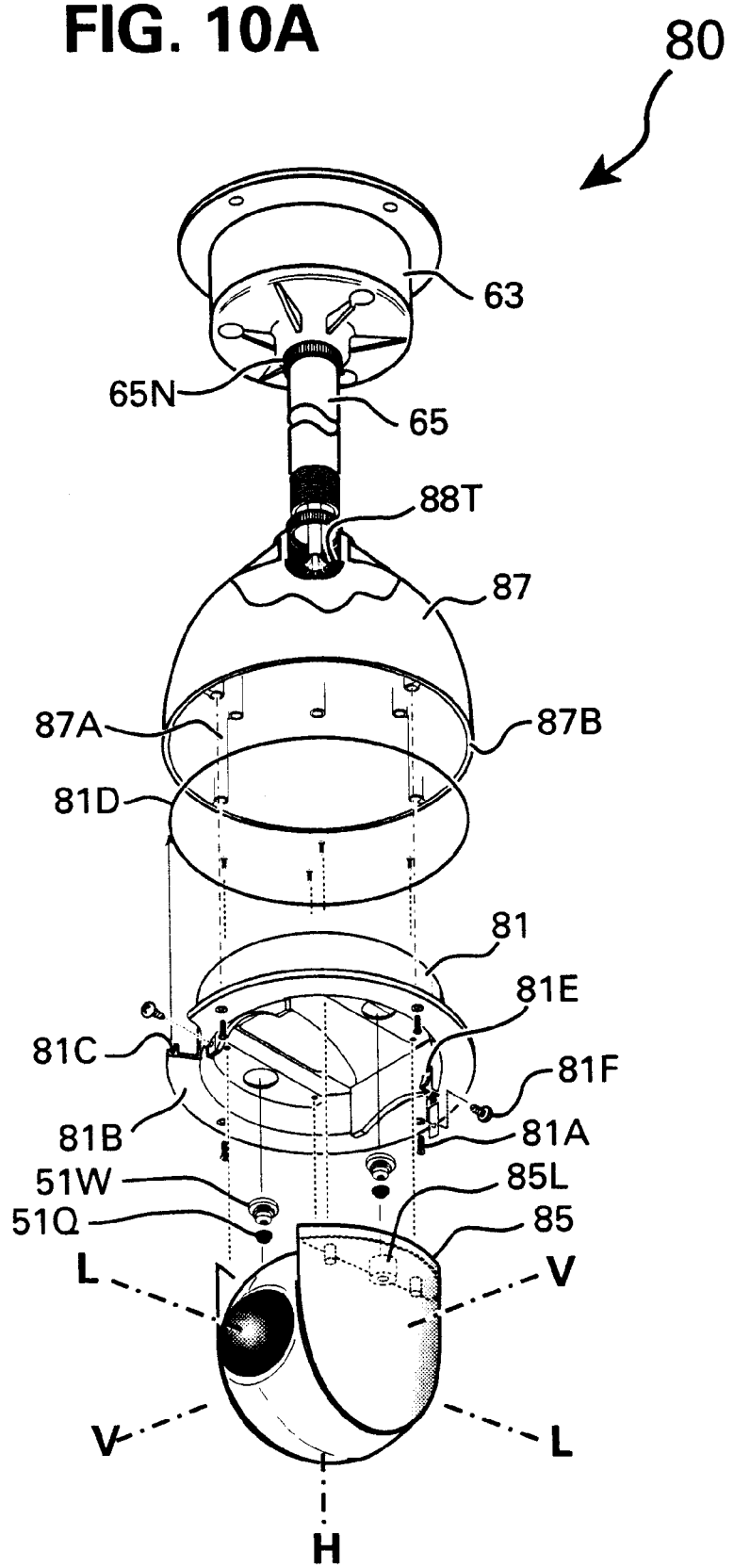

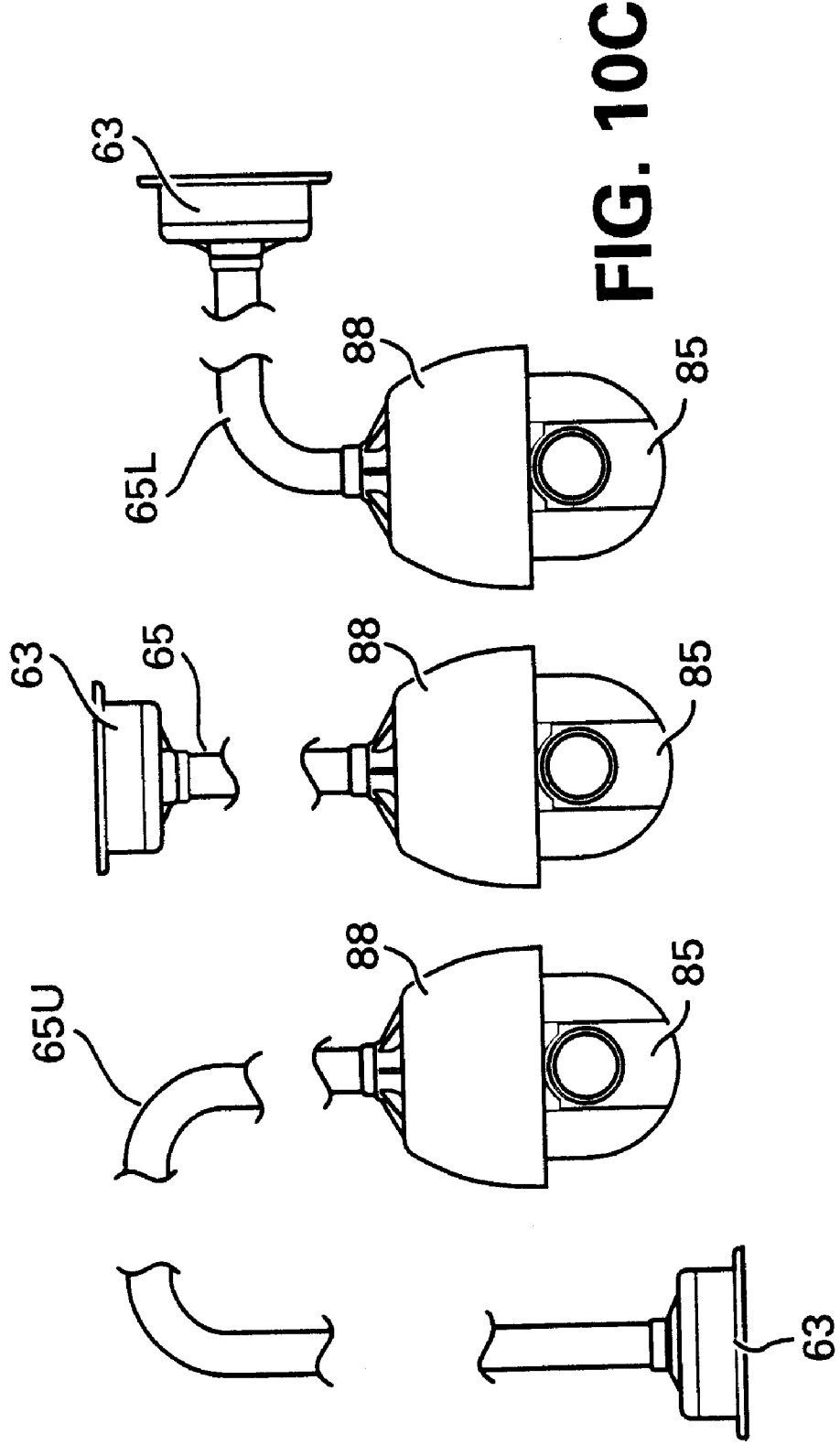

DOME SHAPED CAMERA WITH SIMPLIFIED CONSTRUCTION AND POSITIONING

FIELD OF THE INVENTION

This invention relates to a television camera apparatus used for surveillance applications.

DESCRIPTION OF THE PRIOR ART

Surveillance television cameras are commonly mounted onto a wall, pole, ceiling or other fixed base positions by using an extended arm, known as a camera mount. The extended arm or the camera mount includes a swivel joint which permits the positioning of the horizontal and vertical axis of the camera in order to direct the camera lens toward its intended observation end. Other surveillance cameras are mounted onto a remotely controlled positioning device such as pan-tilt heads consisting of a fixed body which is attached to a wall, pole or ceiling and a movable body to which a television camera is attached. The remotely controlled pan-tilt head employs motors and power transmission assemblies consisting of gears or rollers or belts and pulleys or chains and the like and such pan-tilt heads are generally constructed so that the television cameras rotate angularly about their vertical and horizontal axes. In many cases the television cameras are covered by a housing which is bulky and as a result the entire camera assembly, be it remotely controlled or fixedly positioned, becomes large and heavy and this is very disturbing to the architecture of buildings and interiors.

Some well-known dome housing for television cameras and and/or television cameras mounted inside dome enclosure are commonly used for concealing the camera and diminishing the damage to the building architecture or the interiors. However, such dome-shaped housing and enclosure made of plastic materials are difficult to manufacture with a perfect optical clearance, and therefore such domes cause optical distortions and introduce other optical imperfections into the optical path of the television camera lens.

Other well-known television cameras are fixedly mounted inside a housing having dome-shaped covers and/or dome-shaped enclosures in which the lens faces a portion of the dome which has a good optical clearance. Such dome-shaped television cameras are re-positioned by rotating the entire dome along with the television camera and thereby ensuring that the television camera lens remains positioned against the same clear optical path or portion of the dome. However, even such rotating domes do not provide a perfect clear optical path and moreover, such domes rotating with the television cameras are complicated in their structure.

SUMMARY OF THE INVENTION

It is an object of the present invention to provide television cameras that can be concealed and that are enclosed in a dome shaped enclosure having a perfect and clear optical path and which can be fixedly positioned to observe a given scene, or remotely controlled to reposition the television camera lens by angularly rotating the dome structure about its horizontal and vertical axes for observing different scenes.

Another object of the present invention is to mount television cameras that are enclosed in a dome shaped case so as to be concealed when mounted on wall or other vertical surfaces or recessed inside a wall or other vertical structure.

Yet another object of the present invention is to provide a direct drive pan and tilt motors for remotely positioning the pan and tilt axes of a television camera enclosed in a dome shaped enclosure having a perfect and clear optical path. A direct drive positioning device incorporating a slip ring assembly in the central shaft of the motor is disclosed in U.S. patent application Ser. No. 09/112,120 filed Jul. 8, 1998.

BRIEF DESCRIPTION OF THE DRAWINGS

The foregoing and other objects and features of the present invention will become apparent from the following description of preferred embodiments of the invention with reference to the accompanying drawings, in which:

FIG. 1A is a perspective view of a remotely repositioned television camera enclosed in a dome shaped case of the preferred embodiment;

FIGS. 2A and 2B show an exploded perspective view of the camera body shown in FIG. 1A of the preferred embodiment of the invention;

FIG. 3C is a partion exploded perspective view on axis H—H of FIG. 3A;

FIG. 5A shows another perspective view and an exploded view of a wall mounted camera body shown in FIG. 1A;

FIG. 9 shows an exploded perspective view of an embodiment of the camera body shown in FIG. 8A enclosed into an outdoor cover and supported by a pipe;

FIGS. 10A–10C show exploded perspective views of a modified camera body shown in FIG. 3, enclosed in an outdoor cover and supported by a pipe;

DETAILED DESCRIPTION OF PREFERRED EMBODIMENTS

Figure 1B:
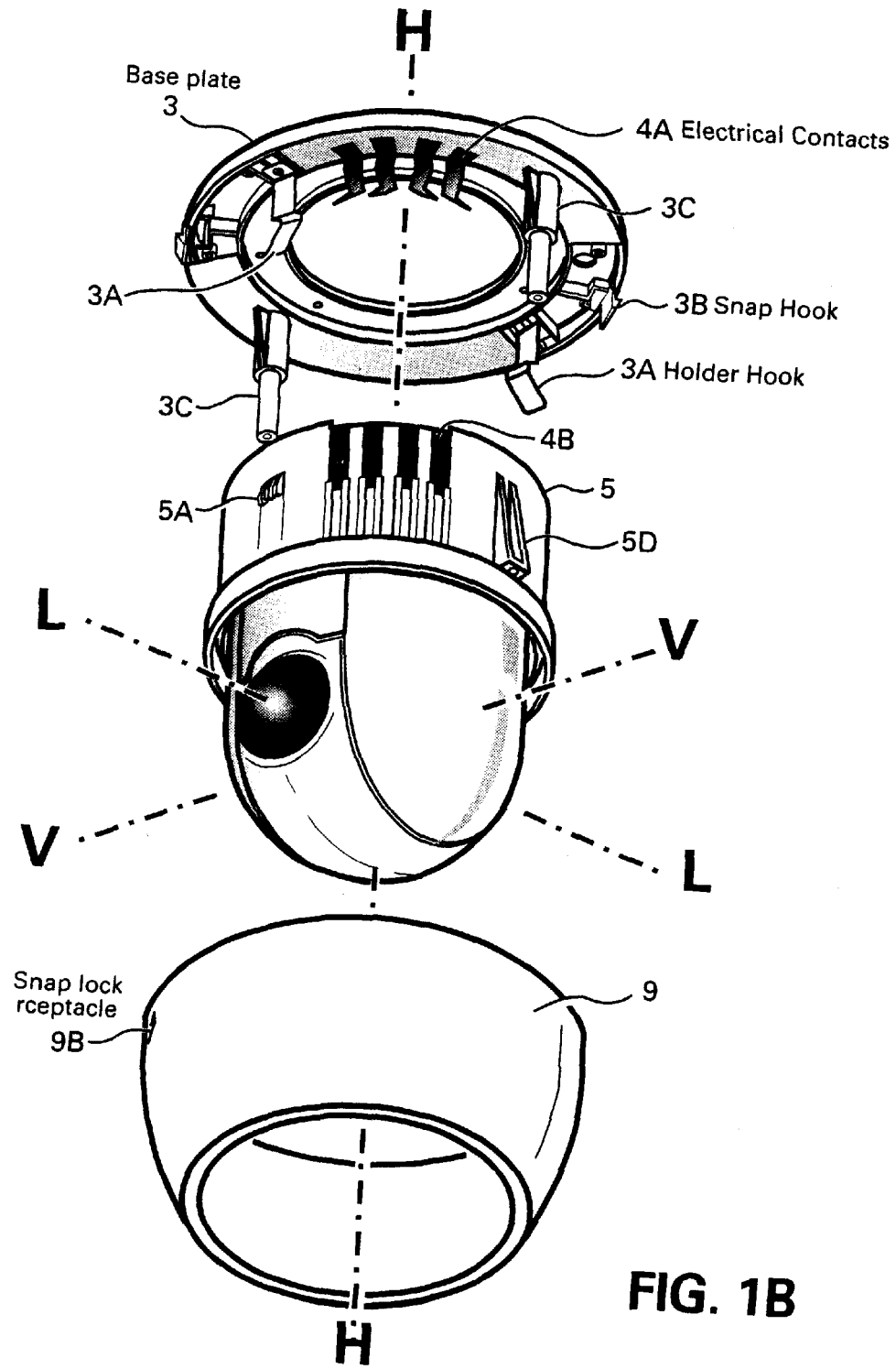
FIG. 1B is an exploded perspective view of the major parts of the camera of FIG. 1A.

A television camera apparatus 1 shown in FIGS. 1A and 1B looks like a well-known dome shaped camera enclosure used in surveillance systems comprising a portion having a transparent or semitransparent dome. The television camera 1 comprises a base plate 3 which is fixedly attached to a ceiling or a shelf or any other horizontal plane and contains electrical contacts 4A for propagating power, control, video and other signals to a matching set of electrical contacts 4B of the camera holder 5 and a pair of holder hooks 3A for locking the camera holder 5 into the base plate 3.

The camera holder 5 is fixedly attached to the rotor of the motor 7D of the camera body 7 shown in FIG. 2, and as will be explained later this allows the camera body 7 to rotate freely around its horizontal axis H inside the camera holder 5. The lower section of the camera body 7 protruding from the camera holder 5 is an elongated dome shaped enclosure; therefore when a cover 9 is locked onto the base 3 through snap hooks 3B and a snap hook receptacle 9B it covers the base plate 3, the camera holder 5 and a portion of the camera body 7; thereby the television camera 1 looks like a well-known dome shaped television camera. FIGS. 1A and 1B enhance the camera sections and segments as well as its lens pane, however the camera body can be tinted in a darker gray level or in any tint that matches the lens pane tint, thereby the segmented lines and the lens pane are indiscernible.

Figure 2A:
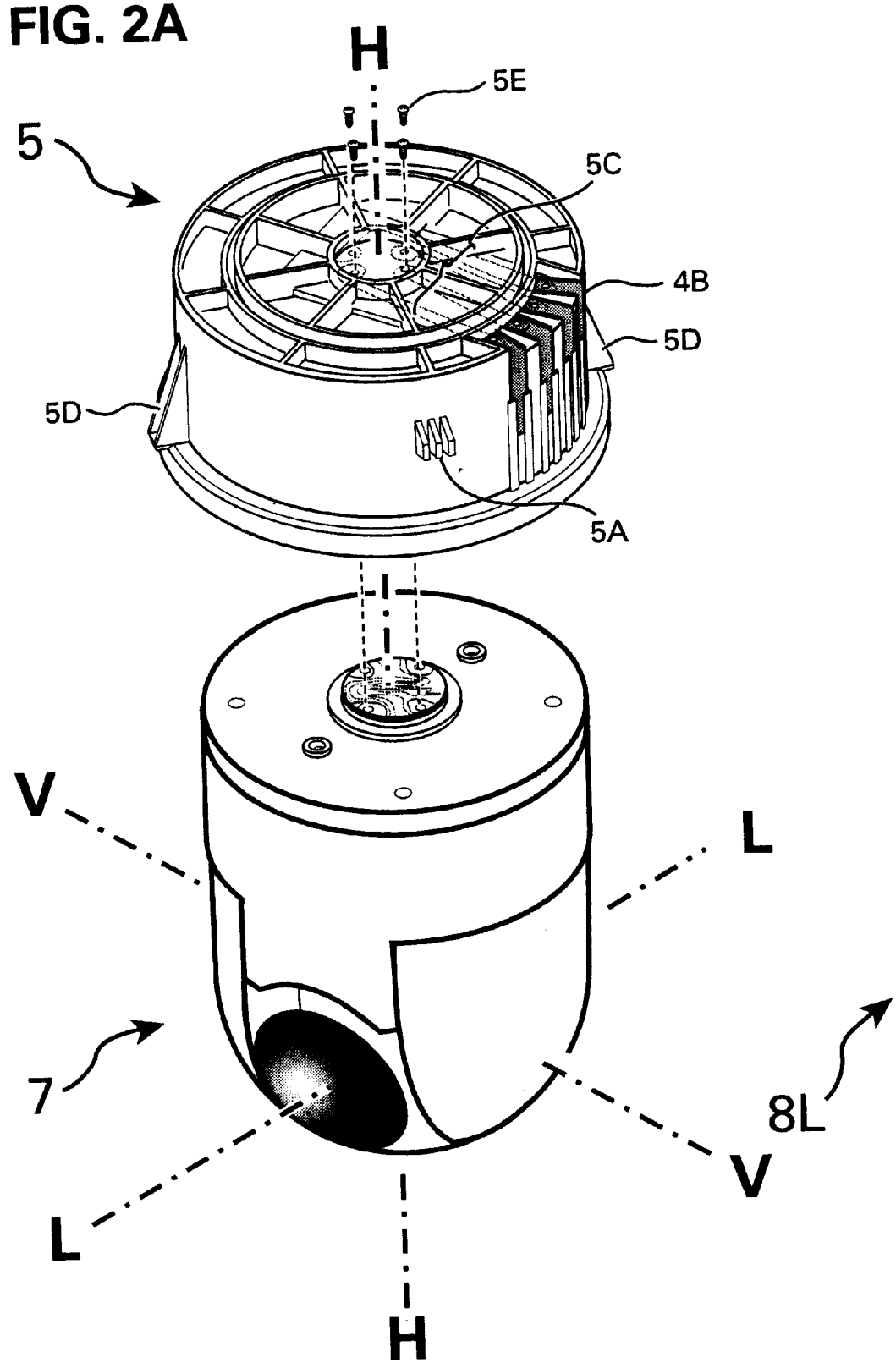

The camera holder 5 shown in FIG. 2 comprises a set of electrical contacts 4B, a set of protruding convexes 5A to which the holder hooks 3A are locked when the camera holder 5 is attached to the base plate 3 shown in FIG. 1B and dual arms 5D for permanently bolting the camera holder 5 onto the studs 3C of the base plate 3.

The camera body 7 consists of an upper base 7B and an upper base cover 7A, a panning motor 7D and a slip ring assembly 7C. The slip ring assembly 7C is mounted inside the exact center hole of the rotor shaft of the panning motor 7D and the panning motor is mounted inside the exact center of the upper base 7B so that the center of rotation of the slip ring assembly corresponds to the horizontal axis H. The slip ring assembly 7C per se is a well-known assembly of rotating conductive metal rings along with complementary mounted conductive metal brushes that provide pressure for a continuous current flow through the metal rings during the rotation of the metal rings.

The slip ring assembly 7C is provided for feeding power, control signals and external sync. to the camera and a video signal, an audio signal and data signals from the camera through the hollow shaft 7S of the panning motor 7D and an opening 7R in the upper base cover 7A for connecting the brushes of the slip ring assembly 7C through the conductive layer 4C of a PCB assembly 4P. The other end of the slip ring assembly uses a socket and plug connection (not shown) to connect the rotating rings to the inner circuits of the television camera. The aforementioned U.S. patent application Ser. No. 09/112,120 filed Jul. 8, 1998 discloses the use of a slip assembly ring inside the center shaft of a motor for directly driving the television camera.

The motor 7D is a well-known stepping motor that can be precisely controlled, to provide a very accurate positioning at electronically controlled speed.

The use of direct drive motor 7D incorporating the slip ring assembly 7C in the center of the shaft of the motor makes it possible to rotate the camera body 7 about its horizontal axis H directly without the use of gears, belts and pulleys, chains and sprockets, rollers or the like and further enables the construction of a slim cylindrical camera body, such as the camera body 7.

The electrical contacts 4B are extended through copper lines 5C shown in dotted lines inside the camera holder 5 so that the PCB 4P of the slip ring assembly 7C which consists of a matching number of conductive layer 4C will make an electrical contact with the extended copper lines 5C of the electrical contacts 4B. Therefore, when the camera holder 5 is attached to the rotor of the motor 7D of the camera body 7 by the screws 5E, the contacts 4B become electrically connected with the slip ring assembly 7C through the extended copper lines 5C and the conductive layer 4C while the camera body 7 can be freely rotated about the horizontal axis H.

The lower camera portion of the camera body 7 consists of left and right-handed elongated segments 8L, 8R of the dome enclosure and a center segment 8 of the dome having a shape of an arcuated drum or a disc. The center segment 8 contains the lens and picture pickup elements, such a well-known CCD device, and the elongated dome segments 8L and 8R which support the center segment 8 contain a tilt motor 8A and bearings, shafts or other well-known pivoted rotating joint parts (not shown) which are extended together with the circular center of the center segment 8 along the V axis for rotating the center segment 8 about the V axis.

The left and right-hand elongated segments 8L and 8R are fixedly attached to the opposite sides of the body of the upper base 7B and have identical segmented curves to match the segmented curve of the center segment and the diameter of the upper base 7B makes the assembly of the elongated segments 8L, 8R, the center segment 8, the upper base 7B and the upper base cover 7A form together the elongated dome structure of the camera body 7, which can be equated to a cylindrical enclosure with a hemispheric bottom and a flat top.

The panning motor 7D which rotates the television camera body 7 about the horizontal axis H directly rotates or drives the camera body 7 in a well-known panning movement, while the tilting motor 8A which directly rotates the center segment 8 about the vertical axis V causes a well-known tilting movement of the center segment. The lens 8Z shown in FIG. 4B which is mounted inside the center segment 8 has its optical center corresponding to the lens axis L and aligned to coincide with the V axis and the H axis.

The vertical axis V (tilt) which is orthogonal to the horizontal axis H (pan) along with the lens axis L (lens) which is orthogonal to the vertical axis V (tilt) and the horizontal axis H (pan) all intersect at the center core of the hemispheric or dome shaped portion of the television camera 7 so as to provide for all-around unobstructed panning and tilting movement within the television camera surrounding.

Figure 3A:
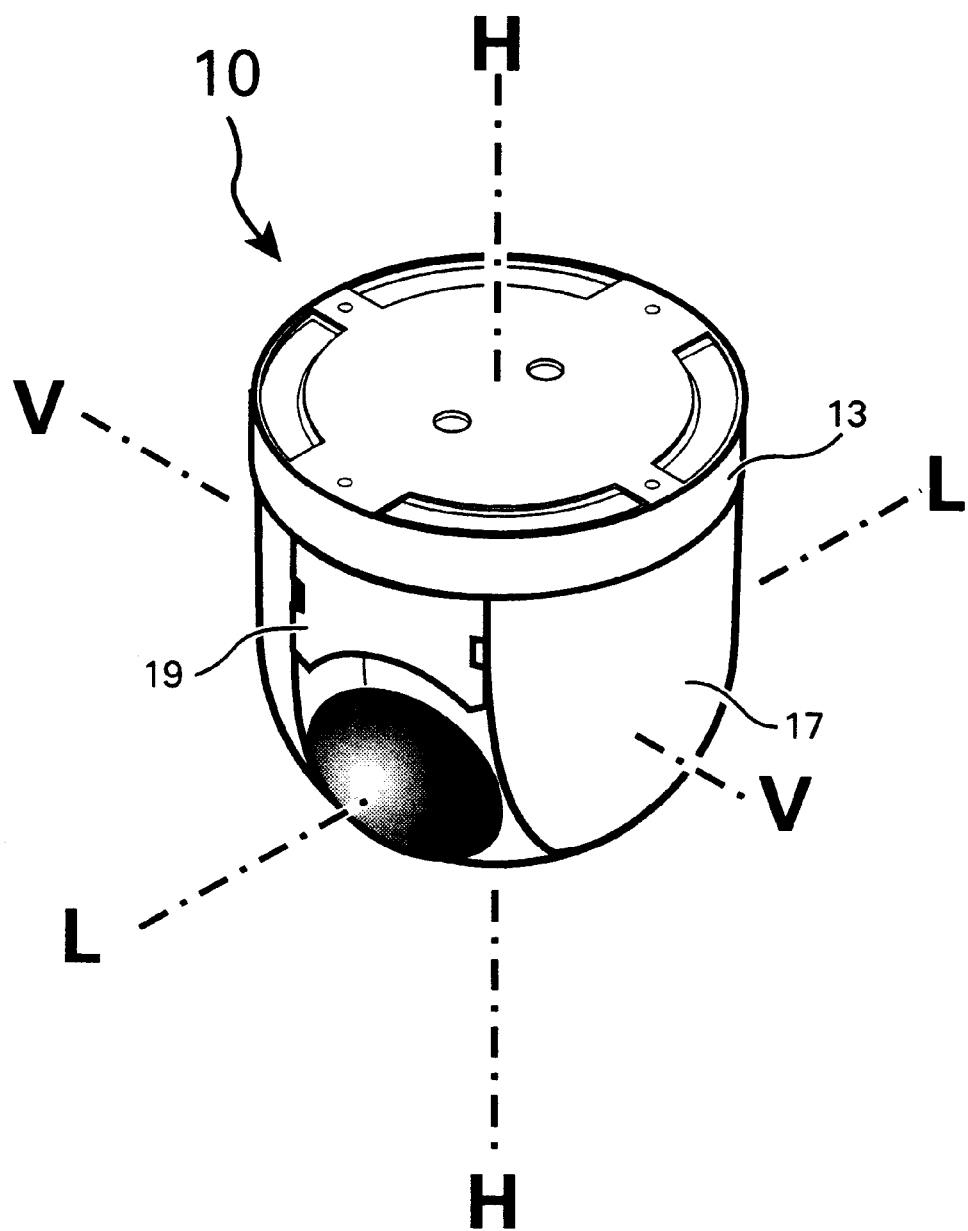
FIG. 3A is a perspective view of a fixedly positioned television camera enclosed in a dome shaped case of another preferred embodiment of the invention.
Figure 3B:
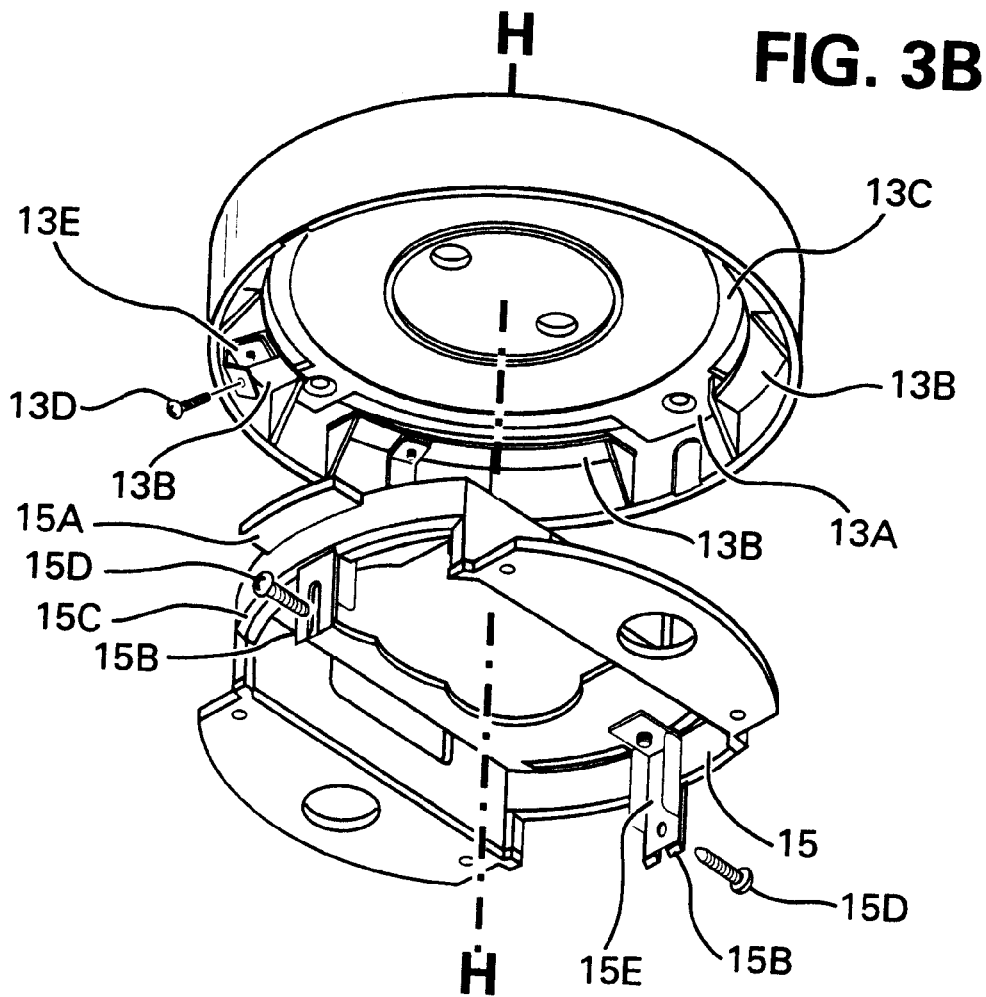
FIG. 3B is an exploded perspective view along axis V—V of FIG. 3A.

The fixedly positioned television camera 10 of FIGS. 3A–3C is enclosed in an elongated dome shaped camera enclosure similarly to the television camera 1. The television camera 10 is manually positioned or directed to observe fixedly a surrounding scene, in two ways, first by adjusting the vertical inclination about the V axis and second by rotating the camera body 17 about its horizontal H axis.

Similarly to the television camera 1, the television camera 10 comprises of a base plate 13 for mounting the camera on the ceiling, shelves or other horizontal surfaces, an upper base or platform 15 which attaches the camera body 17 to the base plate 13, left and right-handed elongated segments of the dome enclosure 18L and 18R and a center segment 18 having a shape of an arcuated drum or a disc.

The center segment 18 contains the lens and the picture pickup elements such as a well-known CCD device, and the elongated dome segments 18L and 18R which support the center segment 18 contain shafts or other well-known pivoted rotating joint parts (not shown) which are extended together with the circular center of the center segment 18 along the V axis for providing that the center segment 18 can freely rotate about the V axis.

The left and right-handed elongated segments 18L and 18R are fixedly attached to the opposite sides of the upper base 15 and because the left and right-handed elongated dome segments 18L and 18R have identical segmented curves to match the segmented curve of the center segment 18 and the diameter of the base plate 13, the assembly of the elongated segments 18L, 18R, the center segment 18 and the base plate 13 form together the elongated dome structure of the television camera 10 which looks like a well-known dome shaped television camera.

The upper base 15 comprises dual protruding hooks 15A that match dual cutouts 13A in a rim 13B of the base plate shown in FIG. 3C. The hooks 15A can be inserted through the cutouts 13A and slid into between the rim 13B and the inner surface of the base plate top 13C and thereby provide for freely rotating the television camera 10 about its horizontal axis H and positioning the lens axis L to adjust to any surrounding scene.

On the other hand, the center segment 18 can be manually adjusted to any inclination angle about its vertical axis V, thereby completing its all-around positioning for observing a scene surrounding the television camera 10.

The upper base 15 further comprises two tongues 15B for locking the center segment 18 to its vertical position about its horizontal axis V and two rims 15C for locking the horizontal position of the upper base 15 about its horizontal axis H.

The doubling of the vertical and horizontal locking facilities is not mandatory; however such arrangement would provide the locking from two opposing sides behind the side covers 19.

The locking of the horizontal and vertical set positions of the television camera 10 is the final process after the camera is installed and this mandates a simple access to the camera locking facilities; therefore the two covers 19 are locked between and onto a rim 18Z of the elongated segments 18L and 18R by two snap hooks 19A, covering the two spaces between the center segment and the base plate 13 containing locking screws 13D and 15D. Each cover 19 is removed by releasing the snap hooks 19A for providing access to the locking screws 13D for the horizontal rim 15C and screws 15D for the vertical tongue 15B.

The horizontal locking screws 13D mounted onto an angle support 13E are positioned toward the rim 15C at an angle complementary to the angle of the rim 15C and when the screws 13D are fastened they lock the upper base 15 into the horizontal set position about the horizontal axis H by the pressure of the tightened screws 15D.

The vertical locking screws 15D are mounted onto holders 15E which are parallel to the tongues 15B and when the screws 15D are fastened they drive the tongue onto the body of the center segment 18 by the screw pressure, thereby locking the center segment 18 into its vertical set position about the vertical axis V.

Figure 4A:
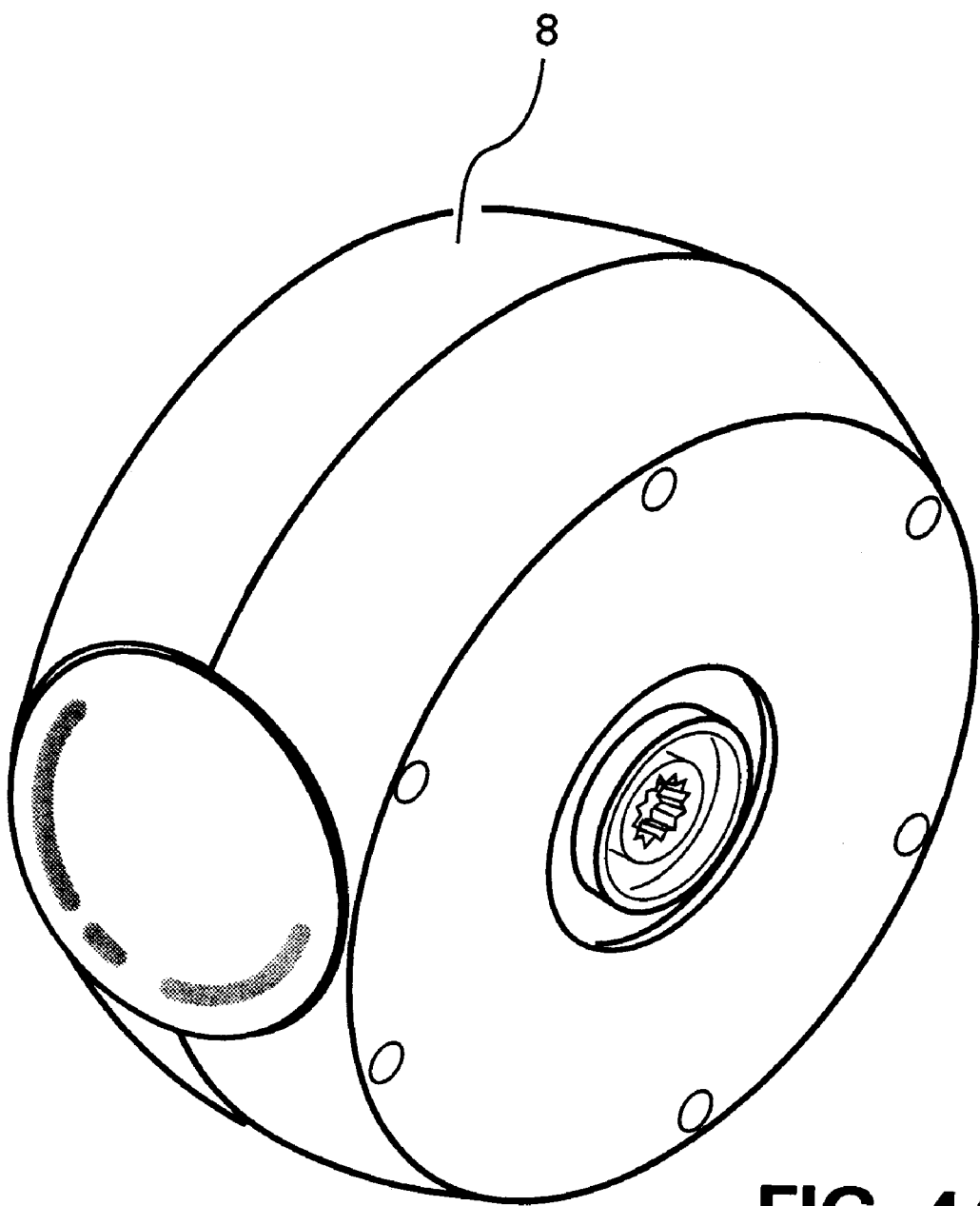
FIGS. 4A and 4B are a perspective view and an exploded view, respectively, of a center segment of the dome which incorporates the lens of the camera of the preferred embodiment of the invention.
Figure 4B:
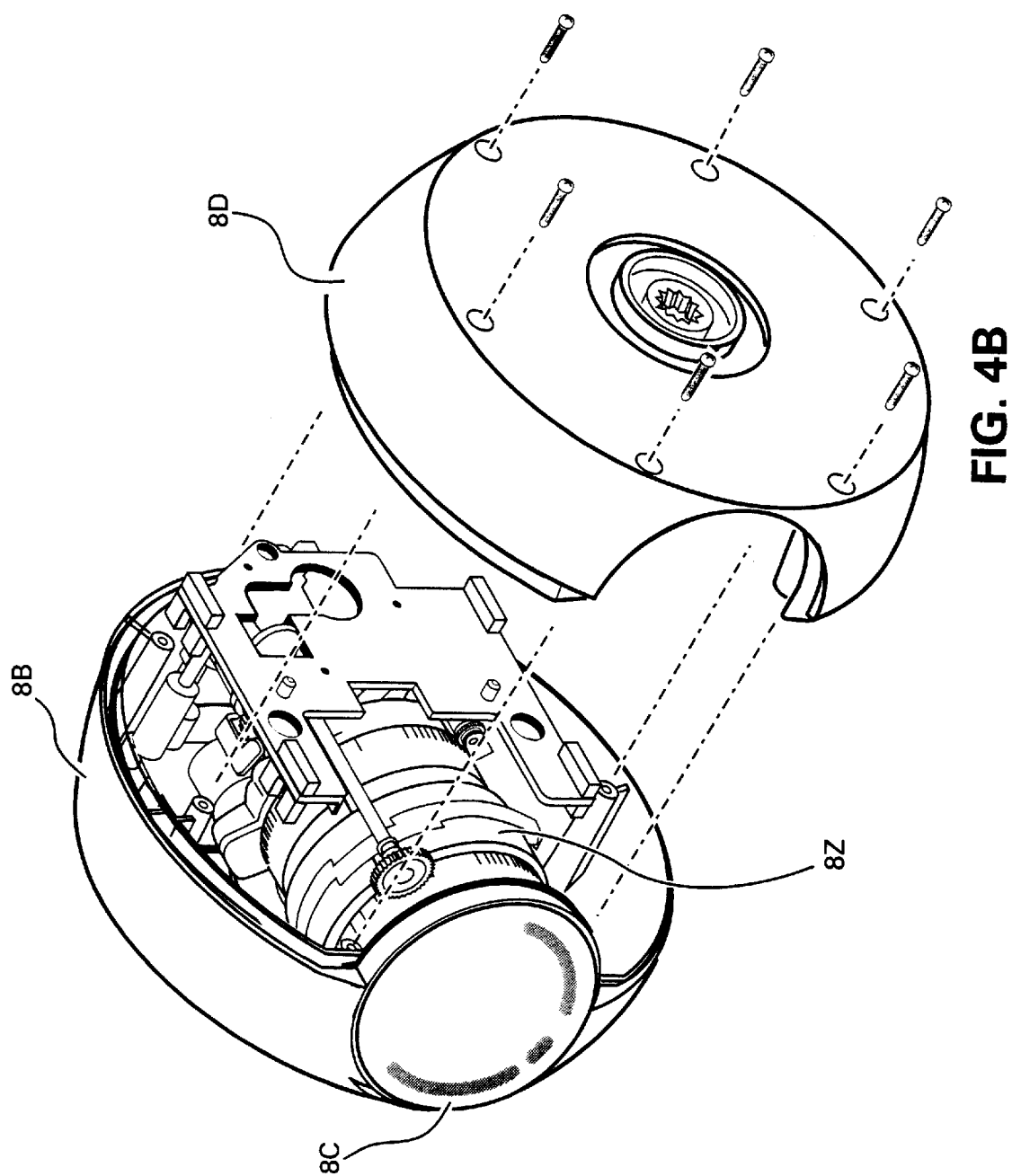

The center segment 8 shown in FIGS. 4A–4B consists of two half center segment covers 8B and 8D, a lens with a picture pickup device 8Z and a lens pane 8C. The diameter of the curvature of the surface of the lens pane 8C is identical to the diameter of the elongated dome; therefore the lens pane 8C can be installed into the half center segment cover 8B in a perfect matching circular surface.

The size and shape of the lens pane 8C is similar to commonly used sunglasses and it is very simple to produce such pane in a perfect optical clearance, with no distortion. It is also very simple to darkly tint the lens pane 8C and the half center segments 8B and 8D identically; thereby the lens pane 8C becomes inconspicuous.

The center segment 18 of FIGS. 3A–3C is very similar in its construction to the center segment 8 shown in FIGS. 4A–4B, except for the pivotally rotating joint parts (not shown) which in the center segment 8 are connected to a tilting motor 8A that provides their tilting movement, while for the center segment 18 no such tie-up to a tilting motor is needed.

It can be clearly seen that the center segments 8 and 18 can be fixedly set or remotely rotated around their vertical axis V and that the camera body 7 of FIG. 2 and the television camera 10 of FIGS. 3A–3B are similar in their inconspicuous appearance, with the exception that the camera body 7 is longer. Both the camera body 7 and the television camera 10 look like an elongated dome or a cylinder that is domed at its lower end or the optical pickup end and is perpendicularly flat at its upper end or the mechanical attaching end, and which can be fixedly set or remotely rotated about its horizontal H axis to observe surround scenes.

It will also become obvious that the camera body 7 and the television camera 10 can be combined with camera holders or base plates for mounting on vertical structure such as walls, poles and the like.

Figure 5:
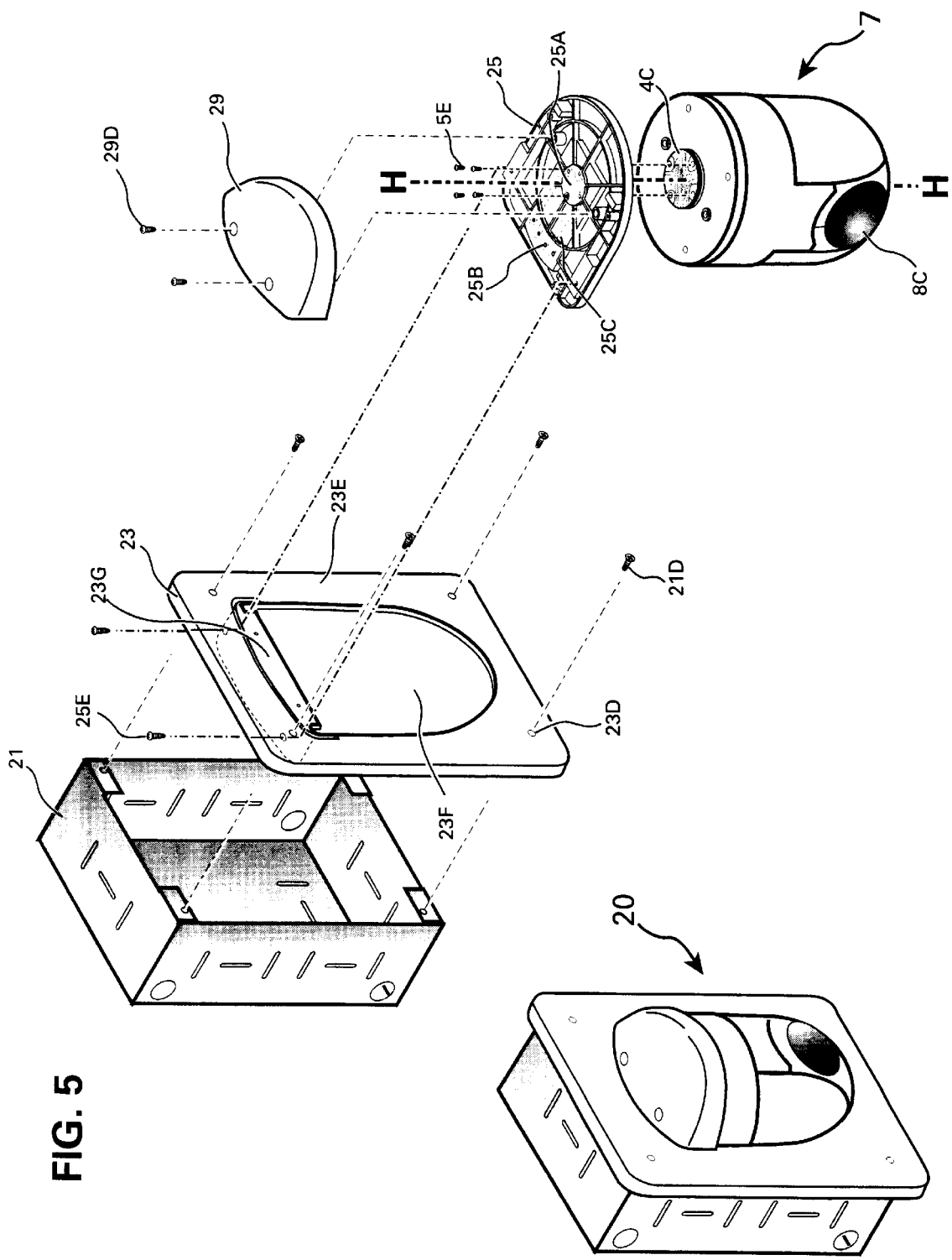
FIG. 5 shows a perspective view and an exploded view of a wall mounted camera body shown in FIG. 1A.

A television camera 20 of FIG. 5 comprises the camera body 7, a wall mounting plate 23, a camera holder 25, an upper cover 29 and a mounting box 21 to be embedded inside a vertical structure such as a wall or a pole. The wall mounting plate 23 uses screws 21D or other fasteners for attaching the plate to the mounting box 21 through mounting holes 23D; similarly screws 25E or other fasteners may be used for attaching the camera holder 25 perpendicularly to the wall mounting plate 23, with the camera holder 25 having its center 25A coincide with the outer surface 23E of the wall mounting plate; thereby the horizontal axis H of the camera body 7 is aligned with the outer surface 23E.

The camera holder 25 is also fixedly attached to the rotor of the motor 7D of the camera body 7 shown in FIG. 2, using screws 5E, and this allows the camera body 7 to rotate freely about its horizontal axis H under the camera holder 25 and inside a cutout 23F of the wall mounting plate 23.

The camera holder 25 shown in FIG. 5 comprises a set of electrical terminals 25B which are extended through copper lines 25C, shown by dotted lines under the camera holder 25, so that the top section of the slip ring assembly 7C shown in FIG. 2 which consists of a matching number of conductive layer 4C will make an electrical contact with the extended copper lines 25C of electrical terminals 25B. Therefore, when the camera holder 25 is attached to the rotor of the motor 7D of the camera body 7 by the screws 5E the contacts 25B become electrically connected with the slip ring assembly 7C through the extended copper lines 25C and the conductive layer 4C while the camera body 7 can be remotely rotated about the horizontal axis H.

When the top cover 29 which is a semicircular cover having a diameter slightly larger than the diameter of the camera body 7 is locked onto the camera holder 25 using screws 29D it covers the camera holder 25 and a top portion of the camera body 7 along with the cutout area 23G in the wall mounting plate through which wires and mounting screws are reachable and visible. Thereby the half of the television camera 20 is exposed, which looks like a half covered elongated dome shaped television camera that is mounted on a vertical surface such as a wall, to be remotely rotated to observe varying scenes in front of the wall.

However, the television camera 20 obviously limits the rotation of the camera body 7 about its horizontal axis H to less than 180°, or to an angle in which the lens pane 83 is not optically obstructed by the wall mounting plate 23.

A television camera 20A of FIG. 5A also comprises the camera body 7, a wall mounting plate 23A, camera holder 25, an upper cover 29A and a mounting box 21A to be embedded inside the vertical structure such as a wall or a pole. The wall mounting plate 23A uses screws 21D or other fasteners for attaching the plate to the mounting box 21A through the mounting holes 23D. Similarly, screws 25E or other fasteners may be used for attaching the camera holder 25 perpendicularly to the wall mounting plate 23A with the camera holder 25 having its center 25A protruding from the outer surface 23H of the wall mounting plate. This enables camera body 7 to rotate 180° about the horizontal axis H of camera body 7 without having the lens pane 83 optically obstructed by the wall mounting plate 23A.

The cutout 23J in the wall mounting plate 23A is smaller than the cutout 23F of the wall mounting plate 23 to match the smaller segment of the camera body 7 that projects into the mounting box 21A. Similarly, the mounting box 21A is shallower than the mounting box 21.

The wall mounting plate 23A further comprises two rims 23K each projected from the outer surface 23H of the mounting plate to cover one side of the segment of the camera body 7 which extends from the outer surface 23H and up to the semicircle line 7L of the camera body 7 and each rim has a cutout portion 23M through which the lens pane 83 will not be optically obstructed when the camera body is rotated to its extreme left or right position, thereby providing for an 1800 horizontal positioning angle about the horizontal H axis with no optical obstruction.

The elongated semicircular cover 29A is similar to the semicircular top cover 29 of FIG. 5 but is elongated to the same extent to that the camera body 7 center protrudes from the wall mounting surface 23H and when the top cover 29A is locked onto the camera holder 25 it covers the camera holder 25 and the top portion of the camera body 7 along with the cutout area 23N in the wall mounting plate 23A through which wires and mounting screws are reachable and visible. Thereby the television camera 20A looks as a partially covered elongated dome shaped television camera that is mounted on a vertical surface such as a wall to be freely and remotely rotated up to 180° about its horizontal axis H to any and all scenes in front of the wall.

Figure 5B:
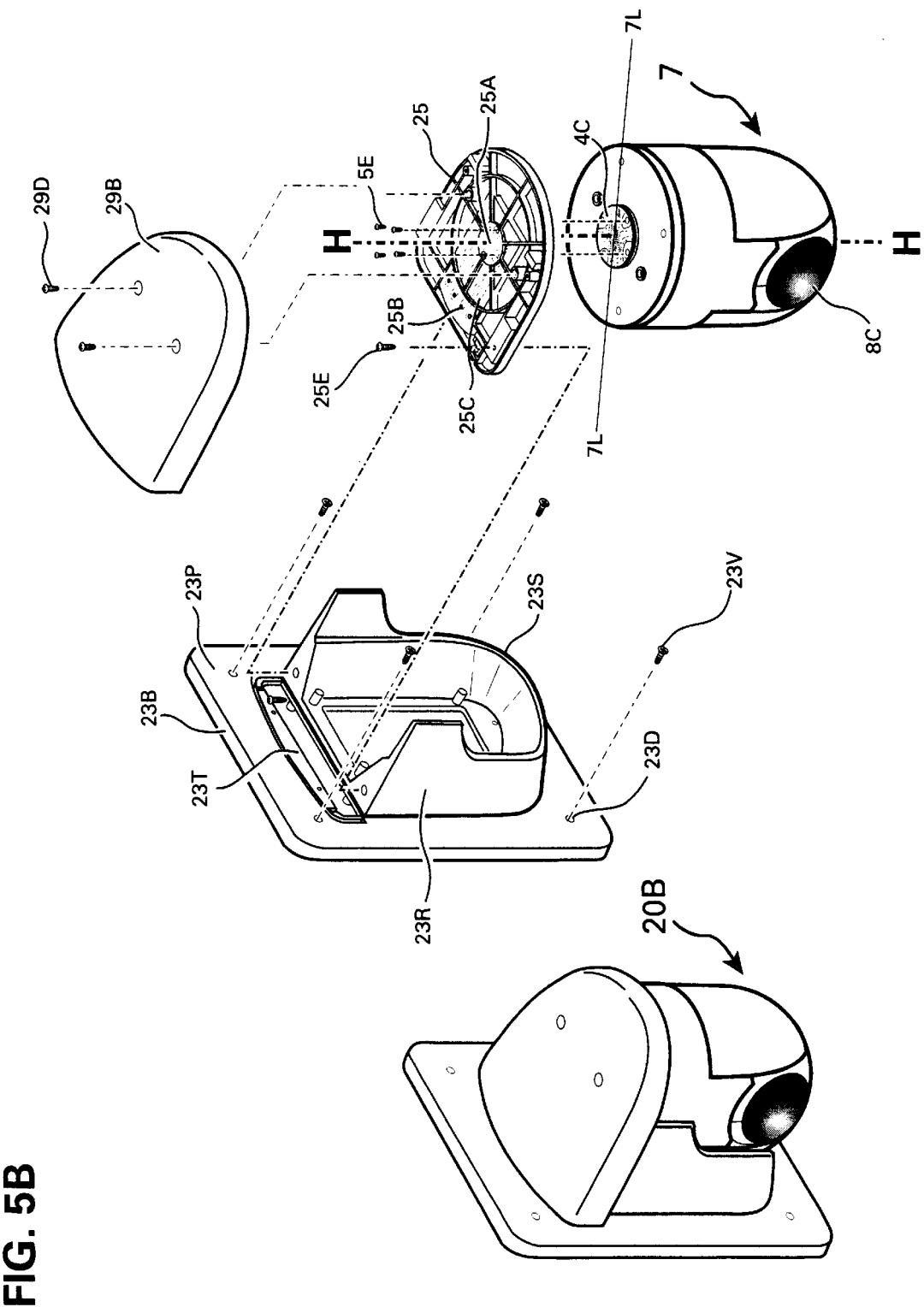
FIG. 5B shows yet another perspective view and an exploded view of a wall mounted camera body shown in FIG. 1A.

The camera 20B of FIG. 5B also looks like a partially covered elongated dome shaped television camera that can be rotated up to 180° about its horizontal axis H without obstructing its optical path, the television camera 20B, however, can be installed flush onto a vertical surface such as a wall or a pole without the use of a mounting box to provide for mounting the television camera 20B in places were mounting boxes cannot be buried inside the vertical structure.

A television camera 20B of FIG. 5B also comprises the camera body 7, wall mounting plate 23B, camera holder 25 and upper cover 29B. The wall mounting plate 23B uses screws 23V or other fasteners for attaching the plate directly to a vertical structure such as a wall, through the mounting holes 23D, similarly, screws 25E or other fasteners may be used for attaching the camera holder 25 perpendicularly to the wall mounting plate 23B with the camera holder 25 having its center 25A protruding from the outer surface 23P of the wall mounting plate by such an extent to allow free rotation of the camera body 7 around its horizontal axis H, without being obstructed by the wall mounting plate 23B.

Instead of two rims 23K of the wall mounting plate 23A projecting to cover two sides of the camera body 7, the wall mounting 23B comprises a single rim 23R surrounding the camera body 7, extending from the mounting plate outer surface 23P up to the semicircle line 7L of the camera body 7 and having a cutout portion 23S through which the lens pane 83 will not be optically obstructed when the camera body is rotated to its extreme left or right position, thereby providing for an 180° horizontal positioning angle about the horizontal H axis with no optical obstruction.

The elongated semicircular cover 29B is similar to the elongated semicircular top cover 29A of FIG. 5A but is further elongated to the same extent such that the center of the camera body 7 protrudes from the wall mounting outer surface 23P and when the top cover 29B is locked onto the camera holder 25 it covers the camera holder 25 and the top portion of the camera body 7 along with the cutout area 23T in the wall mounting plate 23B, through which wires and mounting screws are reachable and visible. Thereby the television camera 20B looks like a partially covered elongated dome shaped television camera that is mounted on a vertical surface such as a wall to be freely and remotely rotated up to 180° about its horizontal axis H to any and all scenes in front of the wall.

Figure 6:
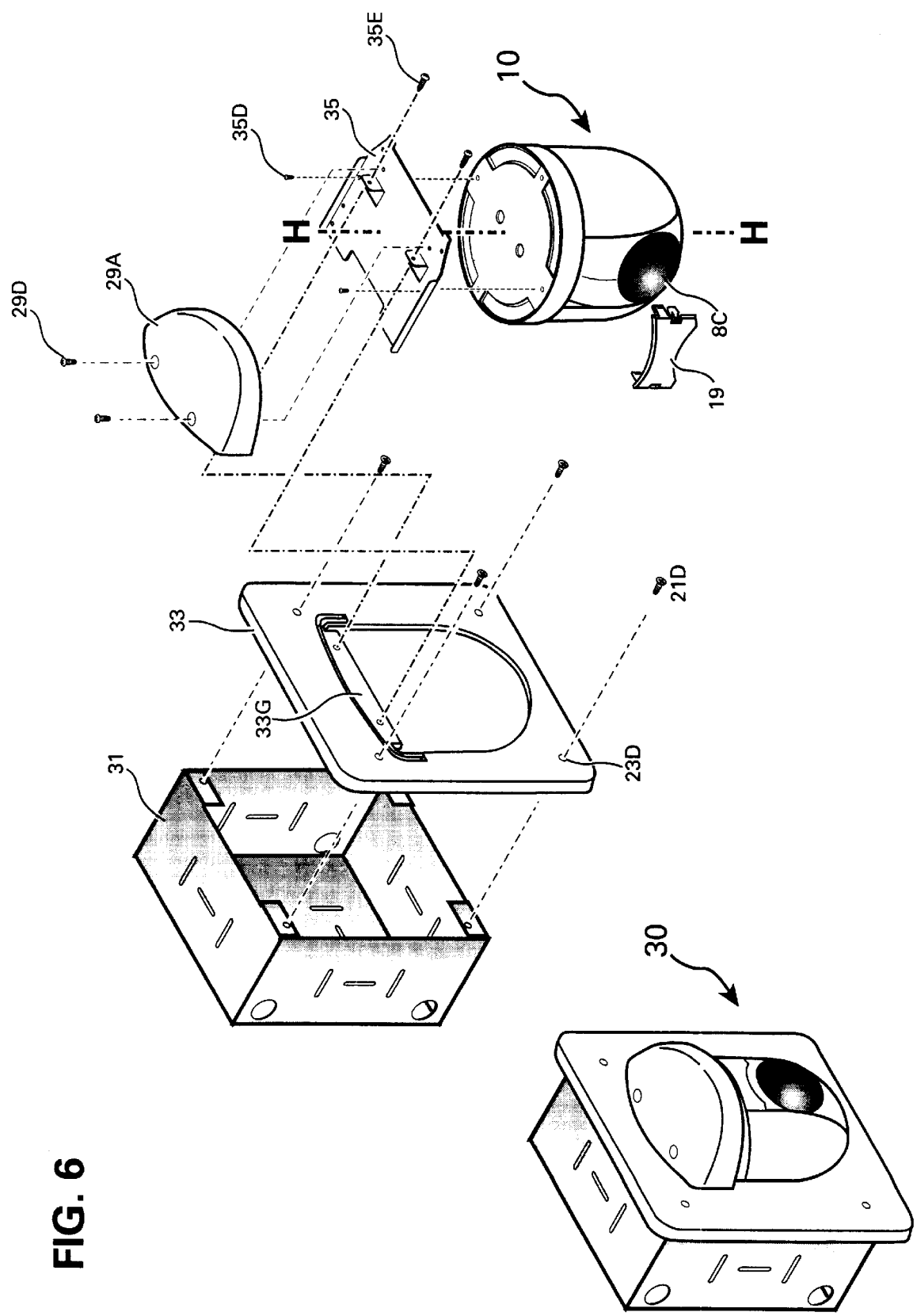
FIG. 6 shows a perspective view and an exploded view of a wall mounted fixedly positioned television camera shown in FIG. 3A.
Figure 6A:
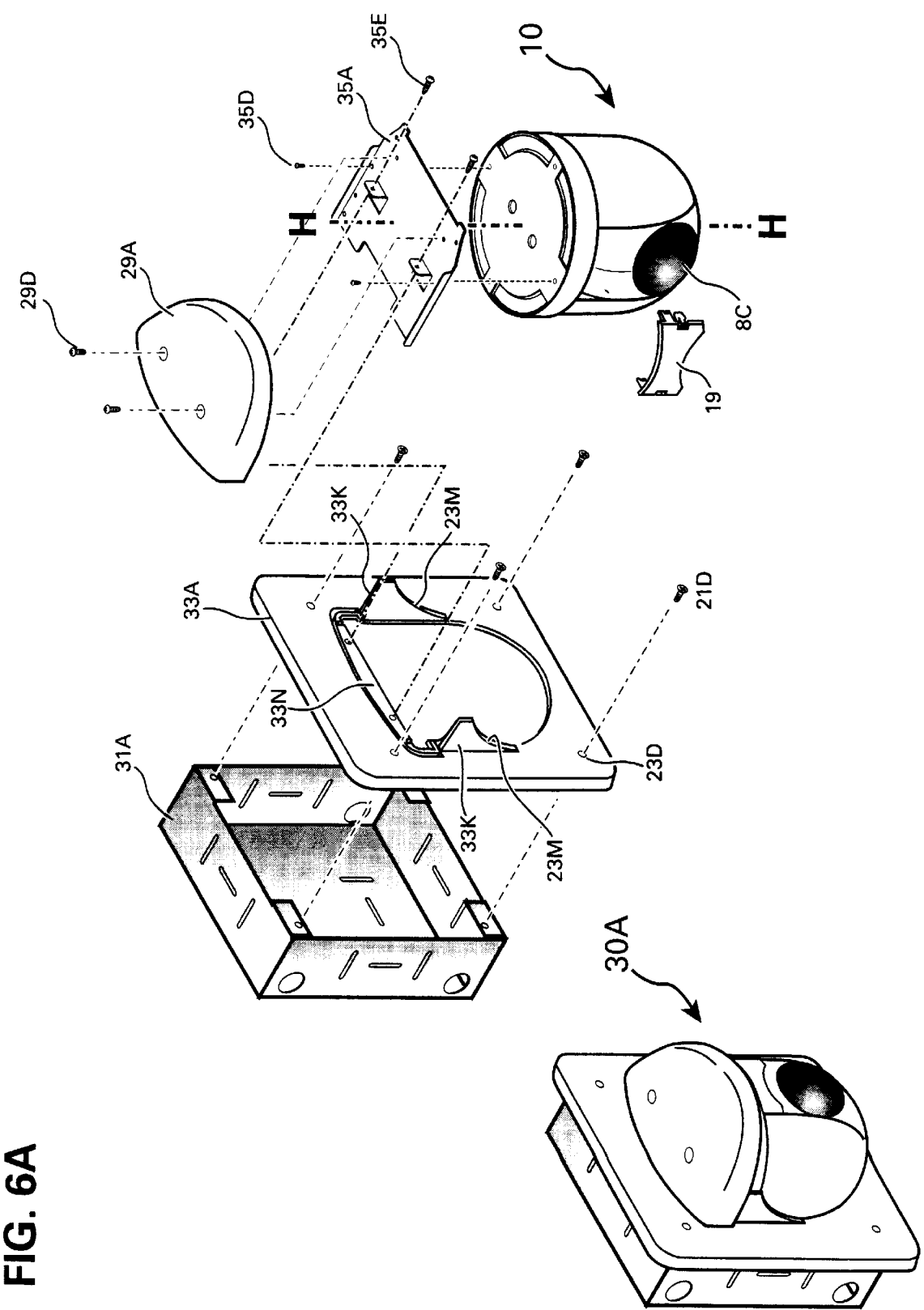
FIG. 6A shows a perspective view and an exploded view an embodiment of a wall mounted fixedly positioned television camera shown in FIG. 3A.
Figure 6B:
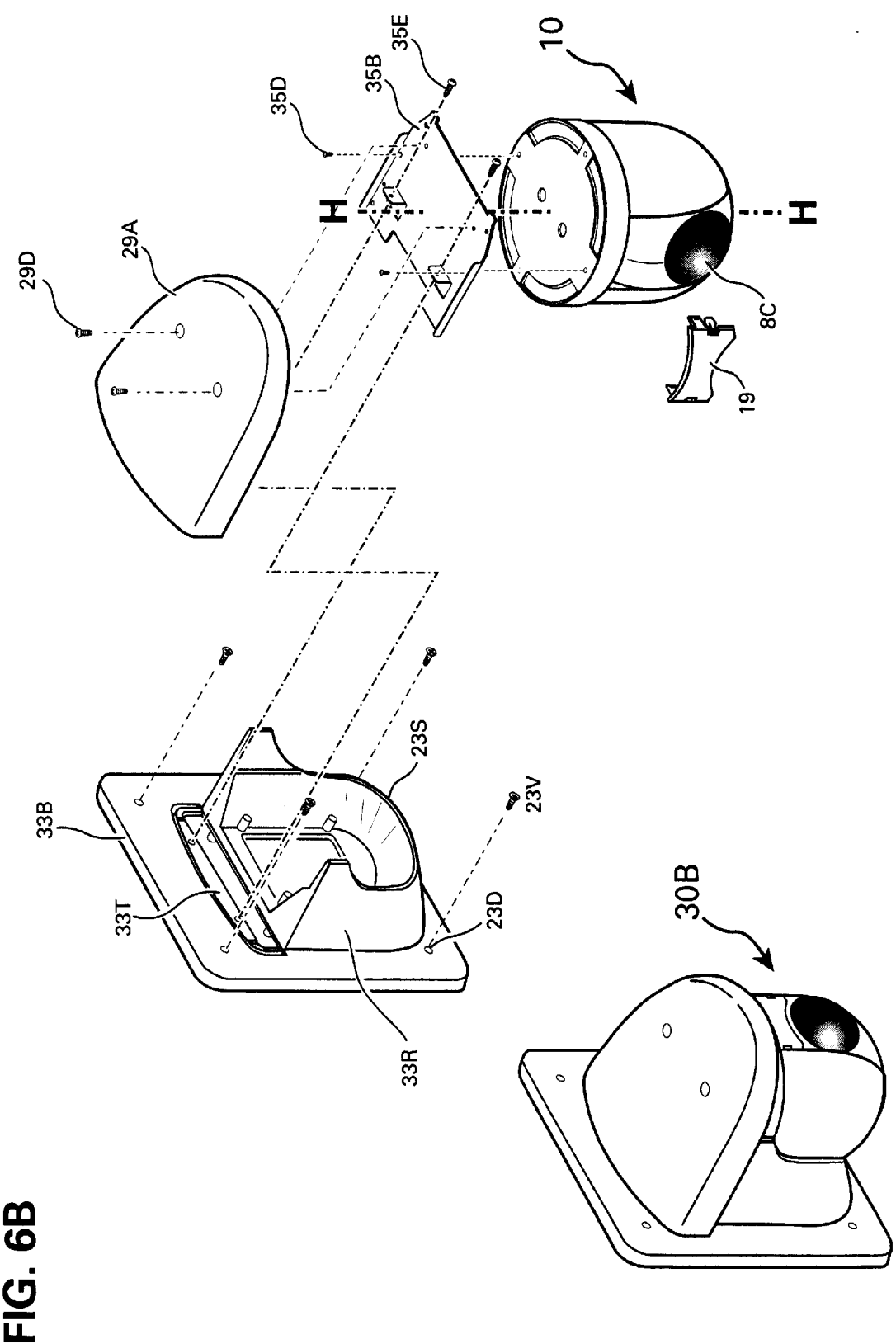
FIG. 6B shows a perspective view and an exploded view of another of embodiment of a wall mounted fixedly positioned television camera shown in FIG. 3A.

The television cameras 30, 30A and 30B of FIGS. 6, 6A and 6B respectively, are similar to the television cameras 20, 20A and 20B, respectively with the exception of the camera holder 25 and the camera body 7.

The television cameras 30, 30A and 30B each comprises the television camera 10 of FIGS. 3A–3B, which can be fixedly positioned around its horizontal axis H and vertical axis V, but is not remotely rotated. Since the length of the television camera 10 is shorter than that of the camera body 7 the height of the wall mounting plates 33, 33A and 33B and the mounting boxes 31 and 31A of cameras 30, 30A and 30B are shorter to fit the shorter television camera 10. Similarly the two rims 33K of camera 30A and the single rim 33R of camera 30B are shorter than the rims 23K of camera 20A and 23R of camera 20B.

Camera mounts 35, 35A and 35B do not incorporate any terminals or copper lines for propagating electrical signals or power to a slip ring and each mount therefore becomes a simple mechanical holder for fixedly mounting the television camera 10 to it, using screws 35D or other fasteners. The camera mount is perpendicularly attached to the wall mounting plates 33, 33A and 33B using screws 35E or other fasteners.

Identical semicircular top cover 29 and the elongated semicircular top covers 29A and 29B are used to cover the camera mount 35 and the top portion of the television camera 10 along with the cutout 33G, 33N and 33T of the wall mounting plates 33, 33A and 33B respectively; thereby the partly-exposed television camera 30 looks like a half covered elongated dome shaped television camera that is mounted on a vertical surface such as a wall to be fixedly set to observe scenes in front of the wall, while the television cameras 30A and 30B look like partially covered elongated dome shaped television cameras that are mounted on a vertical surface such as a wall to be fixedly set for up to 180° about their horizontal axis H to any and all scenes in front of the wall without optical obstruction.

Figure 7B:
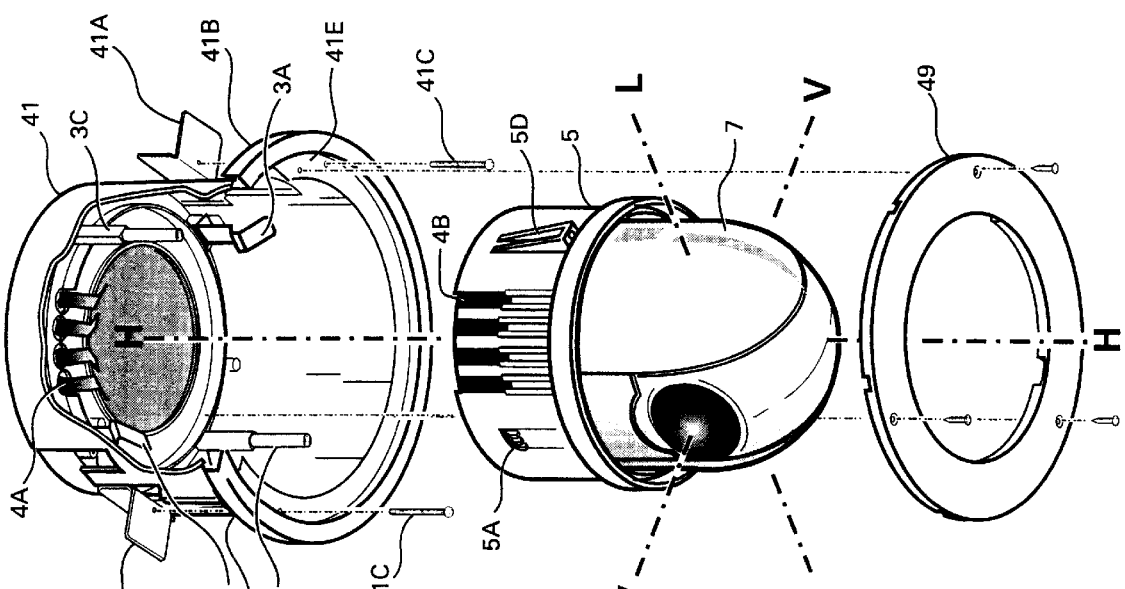
FIGS. 7A and 7B show a perspective view and an exploded view, respectively of a drop ceiling mounted camera shown in FIG. 1A.
Figure 7A:
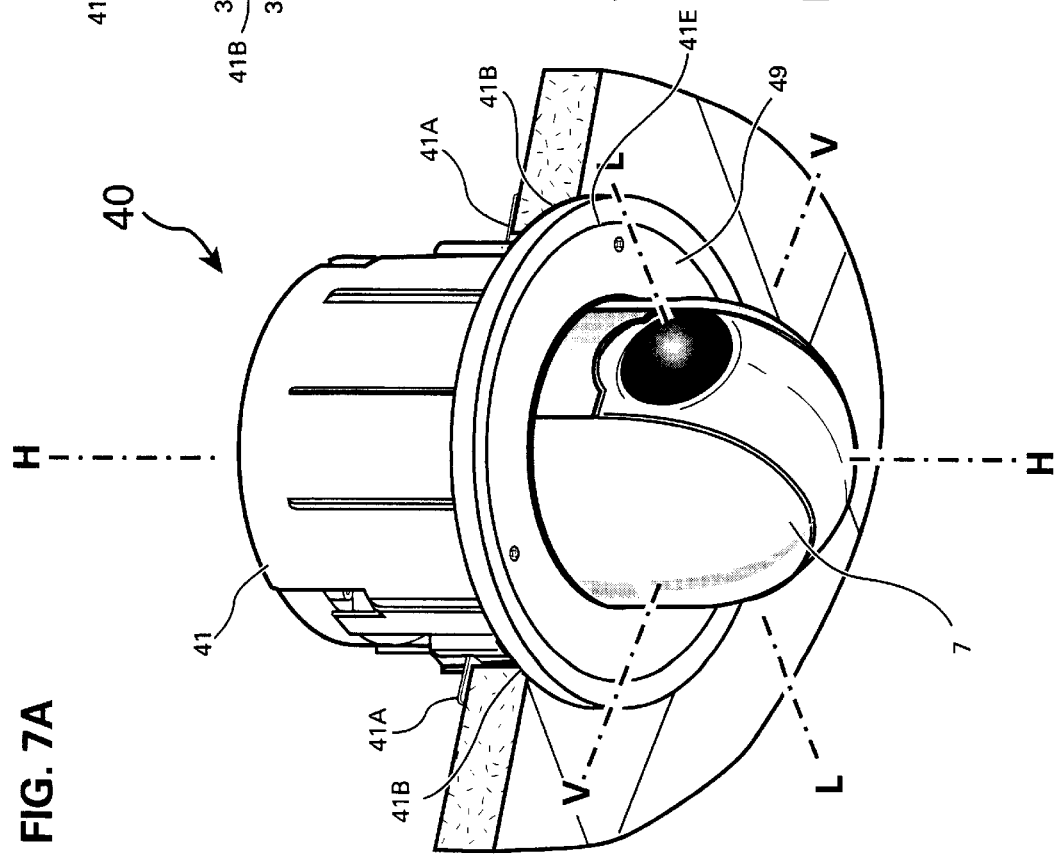

A television camera 40 of FIG. 7 looks like another well-known television camera comprising a dome-shaped enclosure mounted onto a lowered ceiling layer known as a drop ceiling. The television camera 40 comprises a drop ceiling base 41, camera unit 7 and a circular cover 49. The drop ceiling base 41 is inserted into a cutout in the drop ceiling all the way up to rim 41B and is fixedly attached to drop ceiling 42 by tightening screws 41C of latches 41A to lock rim 41B of drop ceiling base 41 into the drop ceiling. The drop ceiling base 41 comprises two holder hooks 3A, dual studs 3C and the electrical contacts 4A similar to the holder hooks 3A, studs 3C and electrical contacts 4A of the base plate 3 of the television camera 1 of FIGS. 1A–1B.

The camera holder 5 is attached to the drop ceiling base 41 in the same way as it is attached to the base plate 3 of FIGS. 1A–1B and it is locked through the holder hooks 3A and is fixedly bolted onto the studs 3C and, when the cover ring 49 is attached to the drop ceiling base rim 41E using screws or other fasteners the television camera 40 looks like a well-known television camera that is enclosed in a dome mounted onto a drop ceiling with only the assembled rim and the domed portion of the camera unit 7 projected under the drop ceiling.

Figure 8:
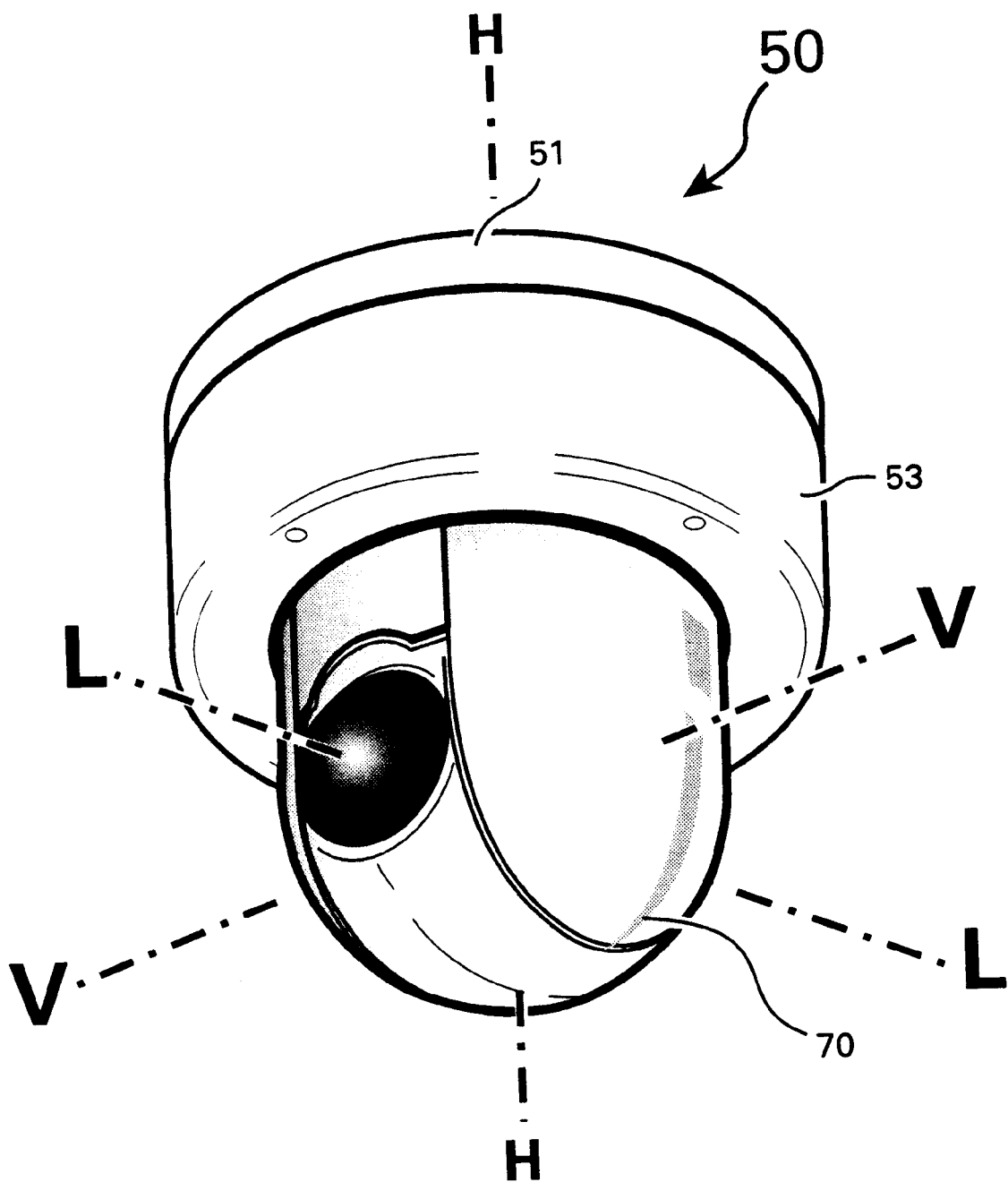
FIG. 8 shows a perspective view of an outdoor mounted camera body shown in FIG. 1A.
Figure 14:
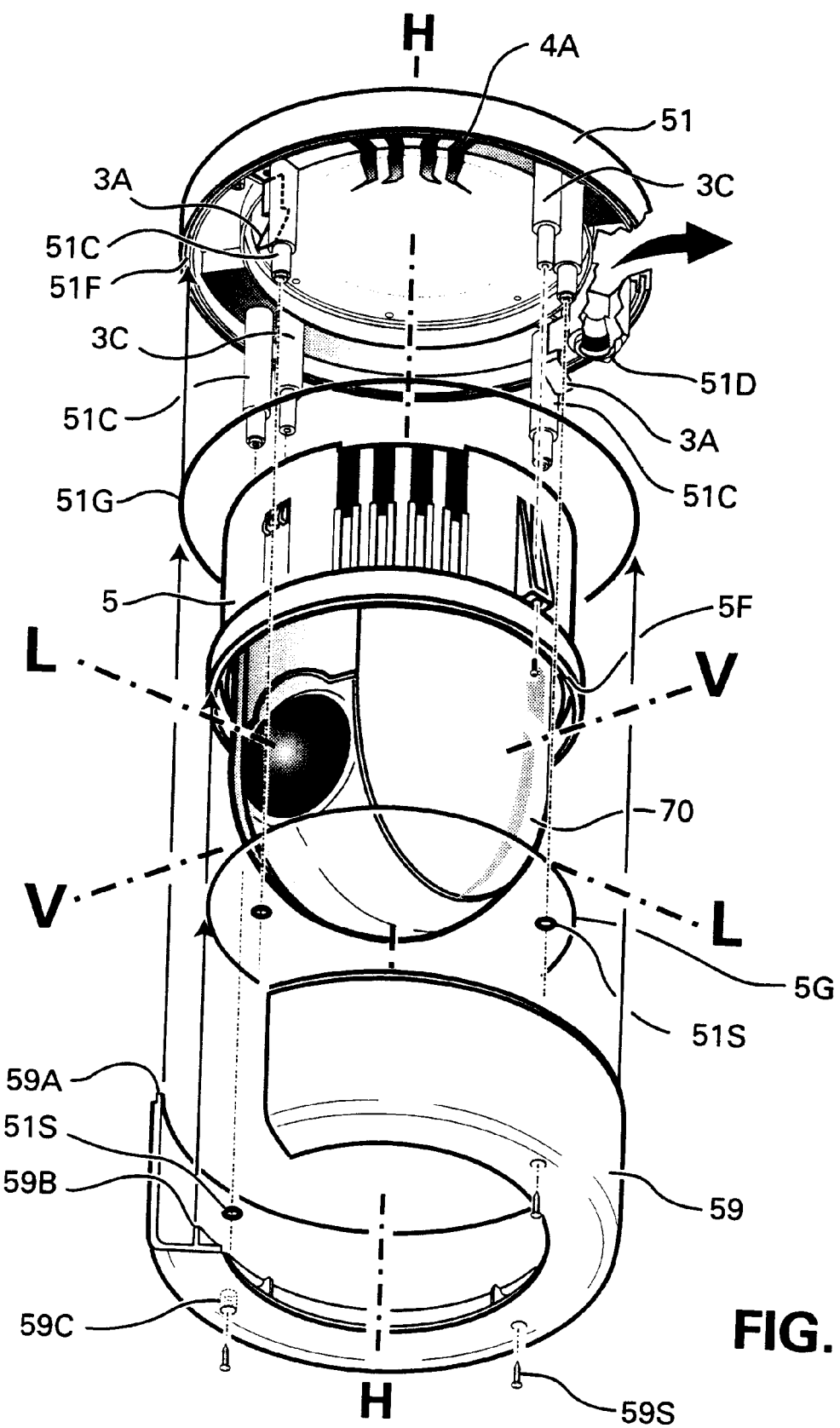
FIG. 14 shows a perspective exploded view of an outdoor mounted camera body of FIG. 8.

A television camera 50 of FIG. 8 which looks like a well-known television camera is enclosed in a waterproof enclosure to be installed in outdoor environment exposed to rain or snow. As shown in FIG. 14, the television camera 50 comprises a base plate 51 which is fixedly attached to a ceiling or to any other horizontal plane and contains similarly to the base plate 1 of FIGS. 1A–1B an electrical contact 4A for propagating power, control signals, video signals and other signals to the electrical contacts of the camera holder 5, a pair of holder hooks 3A for locking the camera holder 5 into the base plate 51 and two studs 3C for bolting the camera holder 5 into the base plate 51. The base plate 51 further comprises four studs 51C for fastening a cover 59 onto the base plate 51 by four screws 59S with each of the studs enclosing a sealing rubber washer 51S which prevents water from entering the base plate 51 via mounting holes 59C in the cover 59, a water sealed cable inlet 51D and a surrounding groove 51F for enclosing an "O" ring seal 51G.

The groove 5F surrounding the camera holder 5 of FIG. 8 also provides for enclosing an "O" ring 5G. The camera holder 5 of FIG. 8 is similar to the camera holder 5 of FIG. 2 and comprises a set of electrical contacts 4B, a set of protruding convexes 5A to which the holder hooks 3A are locked when the camera holder 5 is attached to the base plate 51 and dual arms 5D for bolting the camera holder 5 onto the studs 3C of the base 51.

The camera holder 5 is fixedly attached to the rotor of the motor 5D exactly as shown in FIG. 2 of the camera body 7 using screws 5E, thereby the camera body 70 can be freely rotated about its horizontal axis H inside the camera holder 5, similarly to the camera body 7 with the exception that the camera body 70 is provided with "O" rings, oil seals and other seals so that the camera body 70 can be mounted in outdoor environment and can be exposed to direct rain or snow.

The cover 59 comprises two rims 59A and 59B complementary to a groove 51F of the base plate 51 enclosing the "O" ring seal 51G and to groove 5F of the camera holder 5 enclosing the "O" ring seal 5G and four screw holes with inner studs 59C to complement the four studs 51C each enclosing rubber washer 51S. Therefore, when the cover 59 is fixedly attached and fastened to the base plate 51 using the screws 59S, rims 59A and 59B will put pressure on the oil seals e.g. O-rings 59G and 5G, while the inner studs 59C will pressure the rubber washers 51S which together completely seal the entire inner space between the base plate 51, the camera holder 5 and the cover 59.

Figure 8A:
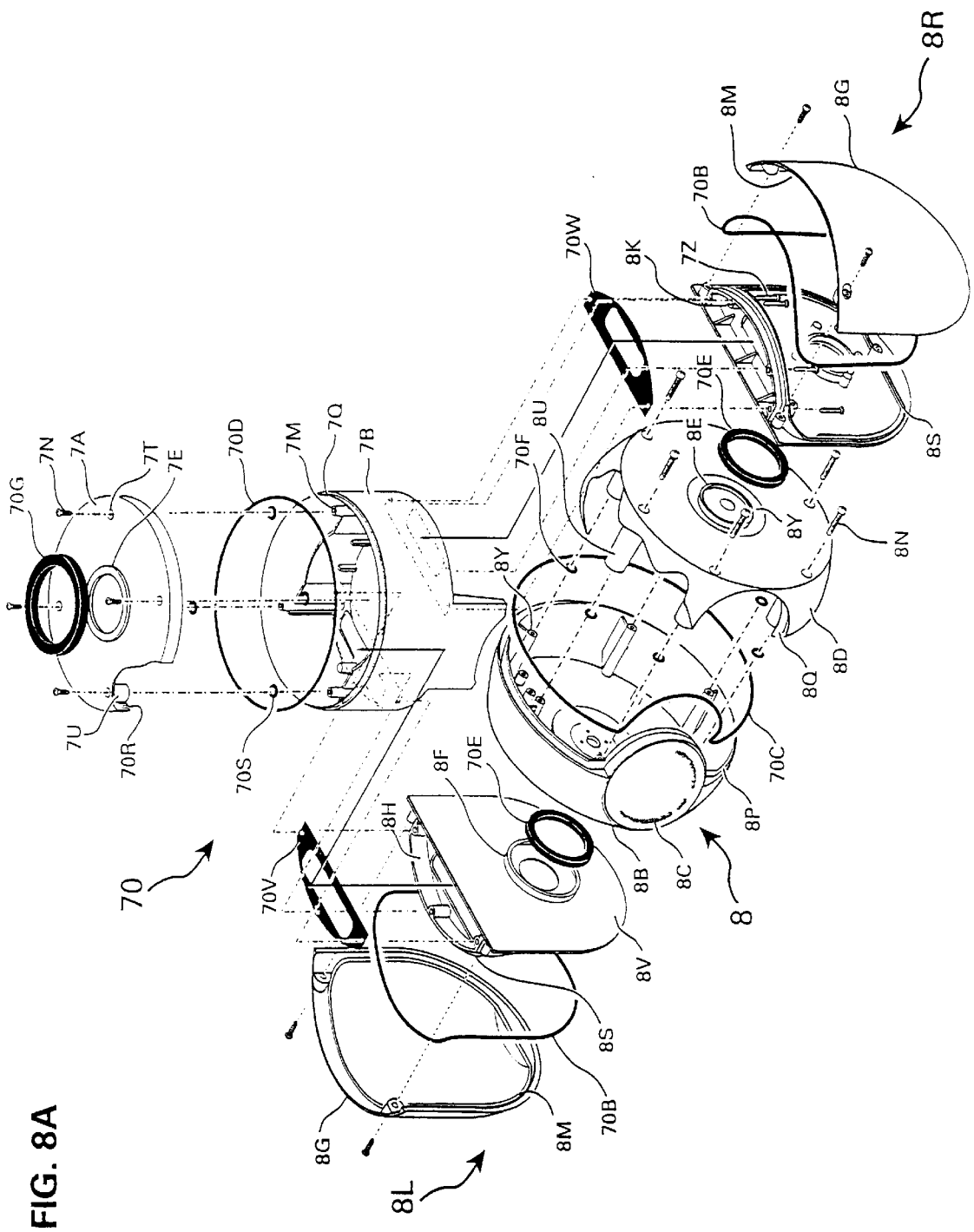
FIG. 8A shows an exploded perspective view of a modified camera body of FIG. 1A sealed for outdoor installation.

The camera body 70 of FIG. 8A is identical in its structure to the camera body 7 of FIG. 2, however the camera body 70 comprises two "O" rings 70B for sealing the elongated segments 8L and 8R, "O" ring 70C for sealing the center segment 8, "O" ring 70D for sealing the upper base 7B, a pair of oil seals 70E for sealing the rotating joints between the center segment 8 and the elongated segments 8L and 8R, an oil seal 70G for sealing the rotating joint between the camera holder 5 and the camera body 7 (as shown in detail in FIG. 13) and two rubber seals 70V and 70W for sealing the fixed joints between the upper base 7B and the elongated segments 8L and 8R.

The elongated segments 8L and 8R have a left-hand base 8H, a right-hand base 8K which is similar to the left base 8H and two covers 8G which are identical. The covers 8G each have a groove 8M each enclosing one of the "O" rings 70B while each of the bases 8H and 8K comprise a rim 8S which is complementary to the grooves 8M for pressure the "O" rings when the covers 8G are attached to the left-hand and right-hand bases 8H and 8K, thereby sealing the elongated segments 8L and 8R.

The left-hand cover 8B of the center segment 8 has a groove 8P enclosing the "O" ring seal 70C while the right-hand cover 8D has a rim 8Q that complements the groove 8P. The right-hand cover 8B further has six studs 8U each enclosing a rubber washer seal 70F, while the left-hand cover 8D has complementary studs 8Y, each positioned at the center of the hole of the fastening screw 8N, thereby when the left-hand and right-hand covers 8B and 8D are fastened together by screws 8N, the rim 8Q press on the "O" ring seal 70C while the studs 8Y put pressure on the rubber washer seals 70V to thereby seal the center segment 8 against water leaks.

The upper base cover 7A has a groove 70R enclosing "O" ring seal 70D while the rim 7Q of upper base 7B is complementary to the groove 70R and thereby when the upper base cover 7A is fastened to the upper base 7B the rim 7Q presses the "O" ring 70D and seals the upper base 7B.

The upper base cover 7A further has four 4 studs 7U each enclosing a rubber washer 70S for sealing the screw holes 7T of the upper base cover 7A for preventing water from penetrating through the holes.

The upper base 7B further includes four complementary studs 7M each directed at the center of the screw holes 7T so that when the upper base cover 7A is tightened by screws 7N the rubber washers 70S are pressed upon and seal the screw holes.

The left-hand and right-hand elongated segments 8L and 8R are attached fixedly to the upper base 7B using the rubber seals 70V and 70W and screws 7Z to tighten the seals 70V and 70W between the bottom surface of the upper base 7B and the top surface of the left-hand and right-hand elongated segments 8L and 8R, thereby sealing the entire attachment area between the upper base 7B and the left and right-hand elongated segments 8L and 8R to prevent water from leaking into the elongated segments and the upper base.

The two rotating joints of the left and right-hand elongated segments 8L and 8R and the center segment 8 and the rotating joint of the camera unit 7 and the camera holder 5 use well-known oil seals for protecting the rotation joints against water leak. Each of the left and right-hand bases 8K and 8H of the elongated segments 8L and 8R has a ring 8F surrounding the joint and extending from the surface 8V to enclose the respective oil seal 70E. The center segment further comprises on each of its covers 8B and 8D a ring 8E to compliment the inner hole of each of the oil seals 70E and an indentation 8Y having a diameter larger than the diameter of ring 8F. The indentation 8Y is deeper than the height of ring 8F, while the ring 8E rises from the surface of the indentation 8Y sufficiently to ensure a good sealing contact with the inner hole of the oil seal 70E. It becomes apparent that the oil seal will prevent water from leaking into the rotating joints and that the protruding ring 8F will not obstruct the rotation of the center segment 8 around its vertical axis V.

Figure 13:
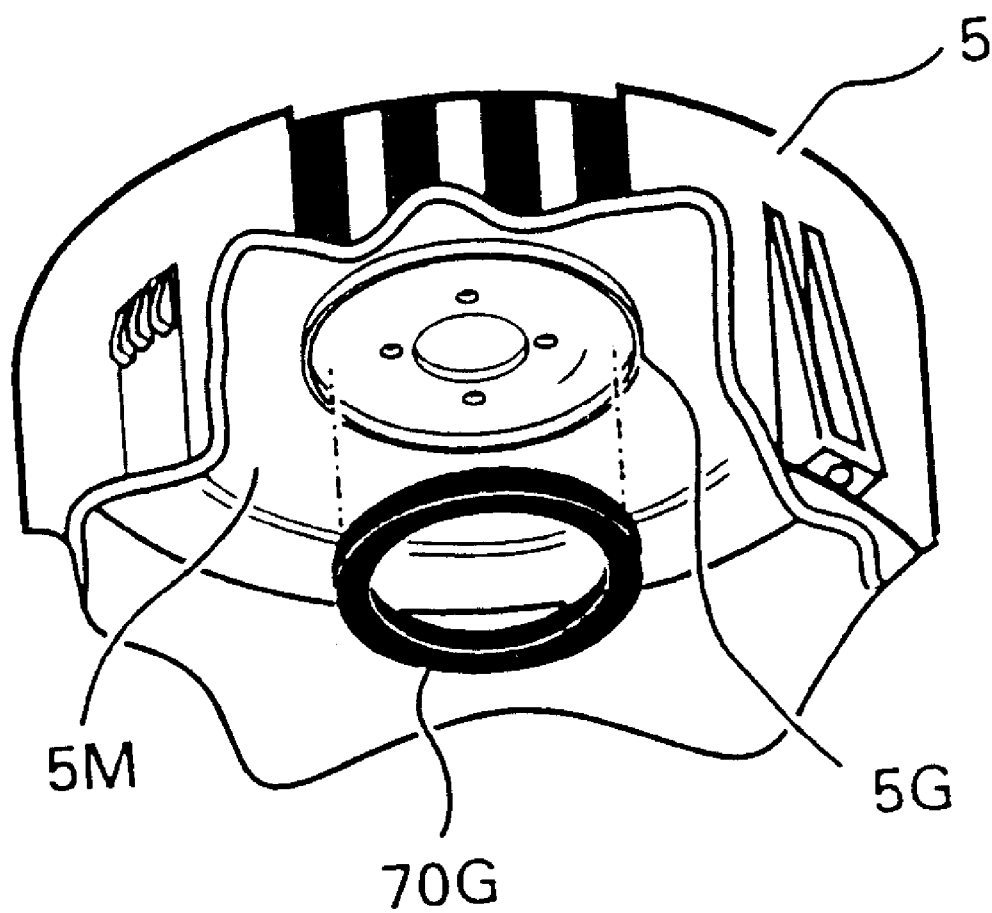
FIG. 13 shows in detail a sealing between a camera holder and a camera body of FIG. 8A.

As shown in FIG. 13, the camera holder 5 further comprises an inner ring 5G around its horizontal axis H, projecting from the inner surface 5M of its top plane and enclosing the oil seal 70G. As seen from FIG. 8A, the upper base cover 7A further comprises a ring 7E surrounding the PCB assembly 4P of the slip ring assembly 7C of FIG. 2. The ring 7E protrudes from the top surface of the upper base cover 7A sufficiently to ensure a good sealing contact with the inner hole of oil seal 70G thereby preventing water from leaking into the rotating joint between the camera holder 5 and the camera unit 7.

Figure 14A:
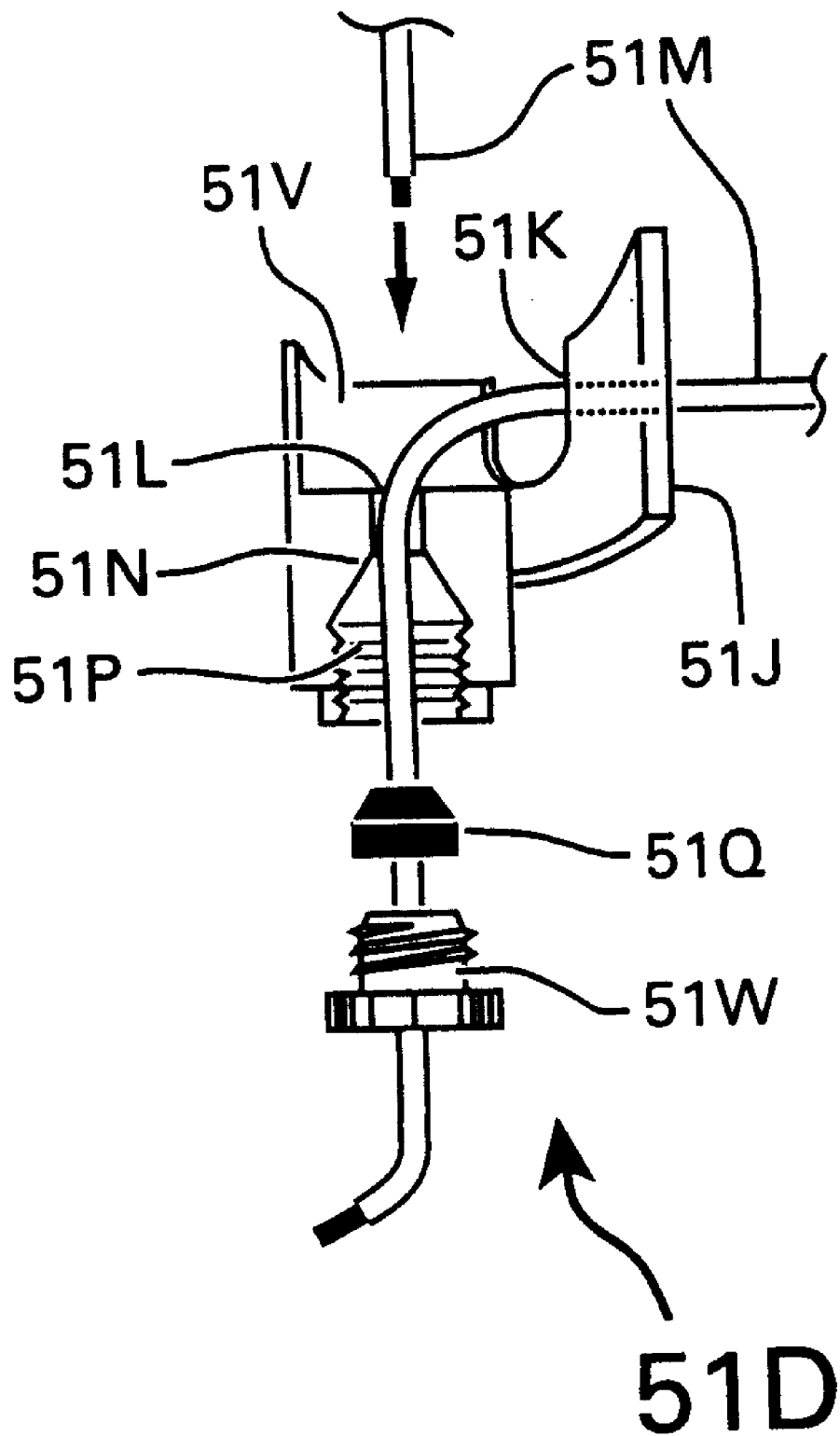
FIG. 14A shows in detail a cable inlet of an outdoor base plate shown in FIG. 8.

The cable inlet 51D of FIG. 14 which is shown in detail in FIG. 14A comprises a two-way cable feed wherein a surface laid cable can be inserted into the base plate 51 through the side wall 51J by cutting out the cable entry 51K for directing the surface laid cable to the cable inlet 51D, or directing a conduit run cable through the open cavity 51V of the rear side of the base plate and feeding the cable directly through the cable inlet 51D. The cable inlet comprises a hole 51L for feeding the cable 51M, a tapered portion 51N for accommodating the tapered cable grommet 51Q and a thread portion 51P for fastening a grommet locking nut 51W and tightening the cable grommet 51Q onto the cable 51M, thereby sealing the cable inlet and preventing water from leaking through the cable passage.

It is apparent that the camera body 70 is sealed throughout the joints of its basic parts, through its cable inlet and through its rotating joints and it is also apparent that the television camera 50 can be installed in outdoor environment exposed to rain and snow, with no water leaking into the camera.

Figure 9B:
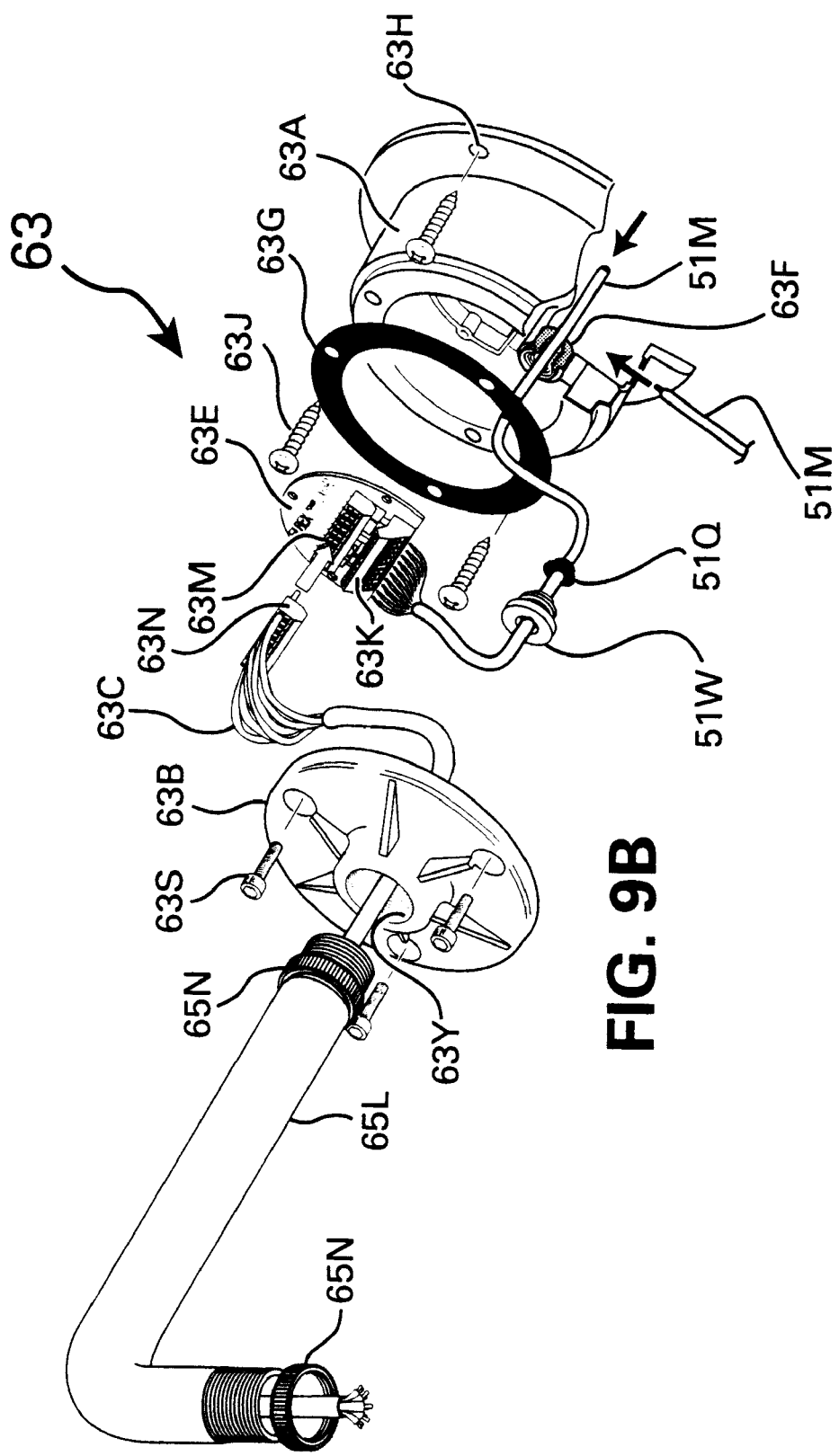
FIG. 9B is an exploded perspective view of a flange assembly of the camera body of FIG. 9A.
Figure 9C:
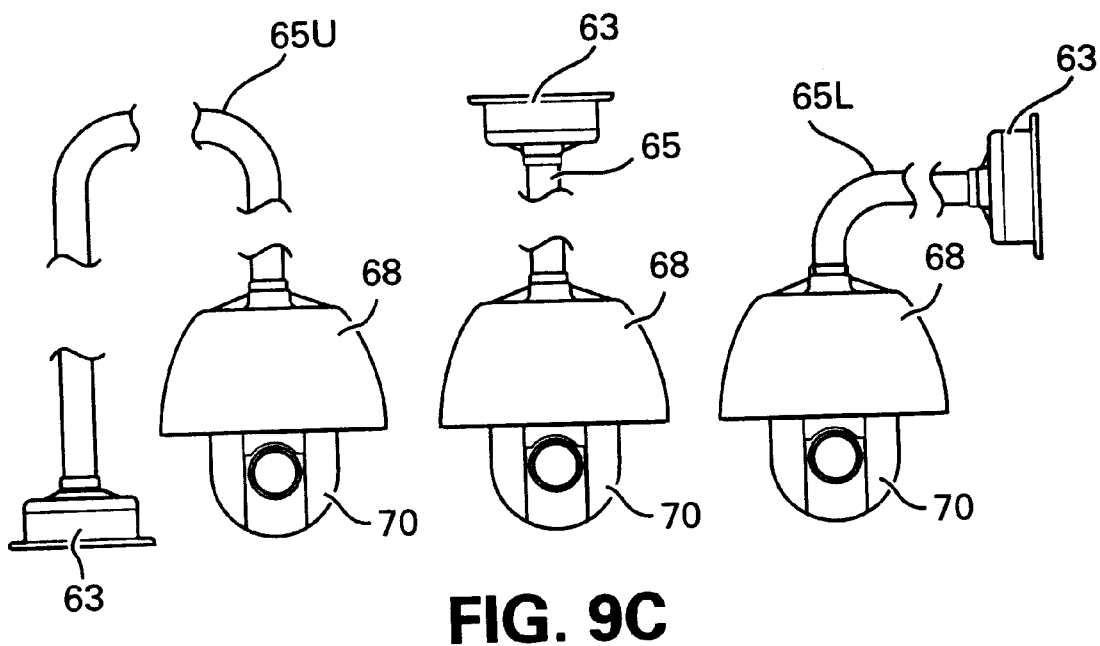
FIG. 9C shows connections between the camera body, the pipe and the flange assembly of FIG. 9A.

A television camera 60 of FIGS. 9A–9C comprises the camera unit 70 of FIG. 8A and an outdoor cover 68, a pipe 65 and a flange assembly 63 and looks like a well-known pendant mounted domed television camera.

The outdoor cover 68 has a shell 67 having a shape of a bell or of an acorn cup, a base assembly 61 and a circular cover 69. The base assembly 61 of a similar arrangement to the base plate 51 of FIG. 8 includes an electrical contact 4A for propagating power, control, video and other signals to the electrical contacts of the camera holder 5, a pair of holder hooks 3A for locking the camera holder 5 into the base assembly 61 and two studs 3C for bolting the camera holder 5 into the base assembly 61.

The base assembly 61 further comprises four studs 61C for fastening the circular cover 69 onto the rim of the base plate 61 by four screws 69S, and a surrounding groove 61F for enclosing an "O" ring seal 61G and an "O" ring seal 61N surrounding the outer rim 61M of the base assembly 61. The base assembly 61 is attached to the shell 67 by four screws 61P through mounting holes 61D which are complementary to four studs 67D of the shell 67. Tightening of the screws 61P will pressure the "O" ring 61N between the outer rim 61M of the base assembly 61 and the rim 67M of the shell 67 thereby sealing the entire surrounding of the shell 67.

The groove 5F surrounding the camera holder 5 of FIG. 8A encloses an "O" ring 5G. The camera holder 5 includes a set of electrical contacts 4B, a set of protruding convexes 5A to which the holder hooks 3A are locked when the camera holder 5 is attached to the base assembly 61 and dual arms 5D for bolting the camera holder 5 onto the studs 3C of the base assembly 61.

Similarly to the television camera 50 of FIG. 8, the camera holder 5 is fixedly attached to the rotor of the motor 5D shown in FIG. 2 of the camera body 70 using screws 5E, thereby the camera body 70 can be freely rotated about its horizontal axis H inside the camera holder 5 and is provided with "O" rings, oil seals and other seals so that the camera body 70 can be mounted in outdoor environment and can be exposed to direct rain or snow.

The circular cover 69 comprises two rims 69A and 69B complementary to the groove 61F of the base plate 61 enclosing the "O" ring seal 61G and to the groove 5F of the camera holder 5 enclosing the "O" ring seal 5G and four screw holes 69C. Therefore, when the cover 69 is fixedly attached and fastened to the base assembly 61 using the screws 69S the rims 69A and 69B will pressure the oil seals 69G and 5G to seal the base assembly 61 and the camera holder 5.

The outdoor cover 68 has an opening with a thread 68T at the center of its top end for a pipe 65. Different shapes of pipe 65 are shown in FIG. 9C. The pipe 65 can be straight for pendant mounting the television camera 60 under a ceiling or under other horizontal planes or structures; the pipe can be formed or bent into L shape 65L for mounting the television camera 60 on walls or other vertical structures, or the pipe can be bent into U shape for mounting the television camera 60 on top of the pole or on top of other horizontal plane or structures.

The pipe 65 is threaded into an opening 68T using a well-known plumber's sealant tape to ensure that water will not leak into the television camera 60. The pipe 65 further comprises two nuts 65N, one to counter lock the pipe to the outer cover 68 and the other to counter lock the pipe to the flange assembly 63.

The flange assembly 63 comprises a flange body 63A, a flange cover 63B, a PCB assembly 63E and a cable inlet 63F.

The flange body 63A has mounting holes 63H for mounting the flange assembly on vertical or horizontal structures using screws 63J. The cable inlet 63F is a waterproof cable inlet similar to the cable inlet 51D of the base plate 51 of FIG. 8A wherein a surface laid cable or a conduit run cable can be fed through it and sealed from the inside portion of the flange using cable grommet 51Q and grommet locking nut 51W. The PCB 63E comprises terminals 63K for connecting the cable fed through the cable inlet 63F and a socket 63M.

The cable 63C connecting the television camera 60 with the flange assembly 63 passes through the pipe 65 and through the opening 63Y of the flange cover 63B and is terminated by a connector 63N for connecting to a socket 63M, thereby completing the connections between a cable fed to the flange assembly 63 and the television camera 60 by the cable 63C and via the pipe 65.

The flange body 63A further has a circular seal 63G to seal between the flange assembly top face and the flange cover 63B when the bolts 63S tighten the flange cover 63B to the flange body 63A.

The pipe 65 is threaded into the opening 63Y using a well-known plumber's sealant tape to ensure that water will not leak into the flange assembly 63 and the nut 65N is used for counter locking the pipe to the cover 63B of the flange assembly 63.

It becomes clear that the television camera 60 comprising the camera unit 70 and outdoor cover 68 supported by pipe 65 and flange assembly 63 can be mounted outdoors exposed to rain or snow and that water will not leak into the camera unit, the pipe or the flange assembly.

If the television camera 60 is installed indoors all the seals used for the television camera 60 and camera unit 70 become unnecessary. Similarly, the flange assembly 63 may be replaced by other type of flanges for attaching the pipe to a ceiling, wall or pole, be it indoors or outdoors.

Figure 10B:
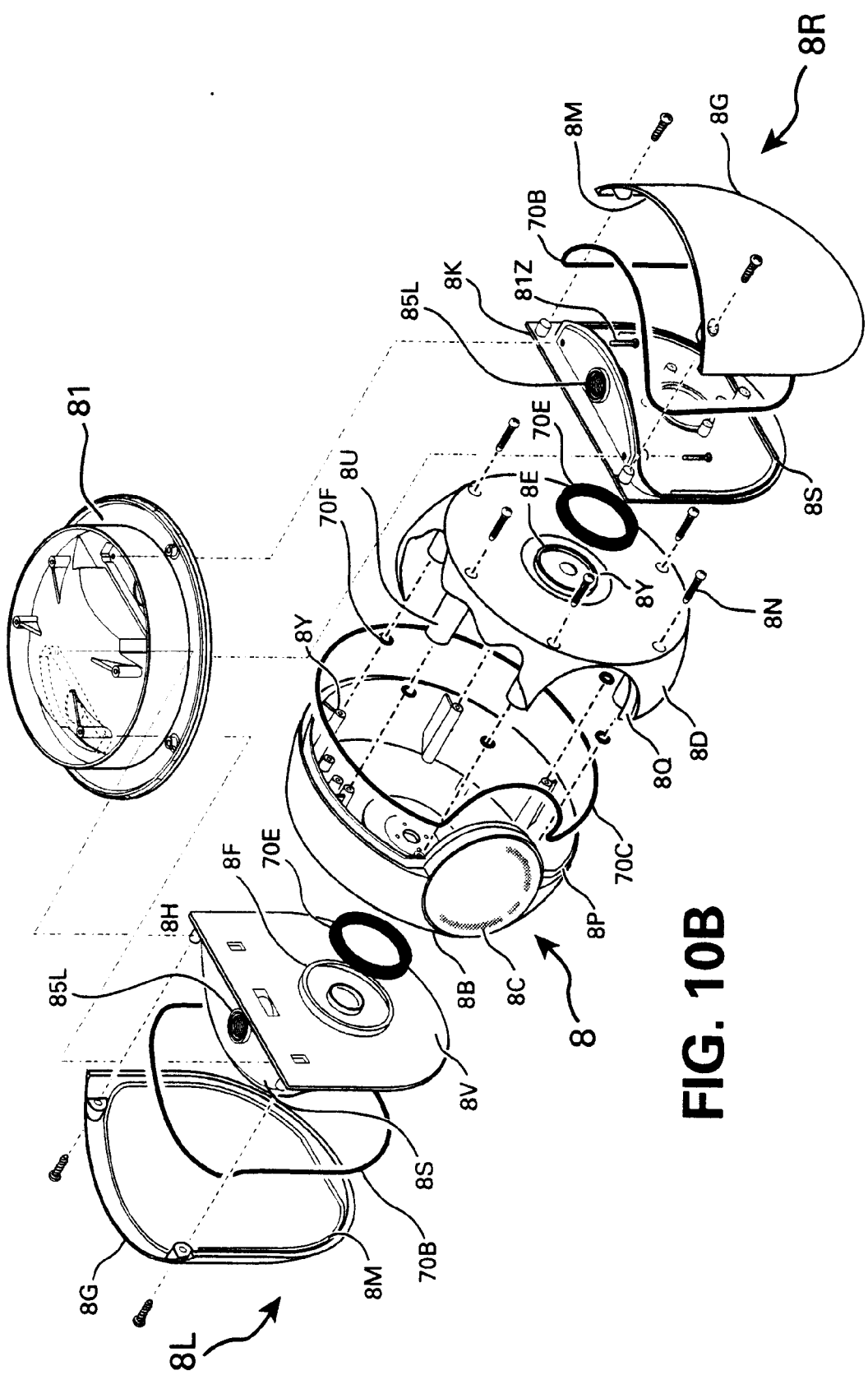

The television camera 80 of FIGS. 10A–10C comprises a camera 85 which is a modified television camera 17 of FIGS. 3A–3C, an outdoor cover 88, pipe 65 and flange assembly 63 and looks like a well-known pendant mounted domed television camera.

The outdoor cover 88 comprises a shell 87 having a shape of a bell or of an acorn cup and a base assembly 81 to which the elongated segments 18L and 18R are attached. The base assembly 81 is attached to the shell 87 by four. screws 81A and comprises an outer rim 81B and a groove 81C enclosing an "O" ring seal 81D. When the base assembly is attached to the outer shell 87 and fastened by the screws 81A into studs 87A of the outer shell 87 the "O" ring seal 81D is pressure against the bottom rim 87B thereby sealing the entire surrounding of the outer shell 87.

The outdoor cover 88 comprises an opening with a thread 88T at the center of its top end for pipe 65. Different shapes of pipe 65 are shown in FIG. 20C. The pipe 65 can be straight for pendant mounting the television camera 80 under horizontal structures or it can be formed or bent into L shape 65L or U shape 65U for mounting the television camera 80 the same way the camera 60 is mounted.

The pipe 65 is threaded into opening 88T using a well-known plumber's sealant tape to ensure that the water will not leak into the television camera 80 in exactly the same manner as television camera 60; however the fixedly positioned television camera 80 can be rotated about its horizontal axis H by rotating the outdoor cover 88 about the pipe 65 and counter locking the television camera 80 into position by the nut 65N. This makes the horizontal positioning setting method of the television camera 17 unnecessary and the elongated segments 18L and 18R of the camera 85 are therefore attached directly to the base assembly 81 instead of to the upper base 15 of the embodiment of FIGS. 3A–3C and the upper base 15 of FIGS. 3A–3C is not needed and not used with the camera 85.

The camera 85 of FIG. 10 is identical in its structure to having the camera elongated segments 8L and 8R and the center segment 8 of FIG. 8A, with the exception of the cable inlets 85L. The camera comprises two "O" rings 70B for sealing the elongated segments 8L and 8R, "O" ring 70C for sealing the center segment 8 and two oil seals 70E for sealing the rotating joints between the center segment 8 and the elongated segments 8L and 8R.

The left and right-hand elongated segments 8L and 8R are attached fixedly to the base assembly 81 using screws 81Z and by this arrangement the seals ensure that water will not leak into the elongated segment 8L and 8R, nor to the center segment 8 or to the rotating joints between the elongated segments and the center segment.

The camera 85 comprises its electronic parts, assemblies and connectors inside the sealed cavities of the elongated segments 8L and 8R while the sealed cavity of the center segment 8 houses optical parts and assemblies and the remaining electronic parts and assemblies; thereby the feeding of the electrical cable or cables for connecting the camera 85 directly to one of the elongated segments 8L or 8R or both through the water sealed cable inlets 85L ensures that no water may leak into the camera through the cable passage as well. The cable inlet 85 is similar to the cable inlet 51D of the base plate 51 of FIG. 8 and has a hole 51L for feeding a cable, a tapered portion 51N for accommodating the tapered cable grommet 51Q and a thread portion 51P for fastening the grommet locking nut 51W and tightening the cable grommet 51Q onto the cable, thereby sealing the cable inlet.

The base assembly 81 further comprises a tongue 81E to lock the vertical setting of the center segment 8 about its vertical axis V. The flexible tongue supported by a locking screw 81F which pushes the tongue onto the center segment by tightening the screw 81F, thereby locking the center segment into position.

The flange assembly 63 used for the television camera 80 is identical to the flange assembly 63 used for the television camera 60.

It becomes clear that the television camera 80 comprising the camera 85 and outdoor cover 88 supported by pipe 65 and flange assembly 63 can be mounted outdoors exposed to rain or snow and that water will not leak into the camera, pipe or flange assembly.

Figure 11A:
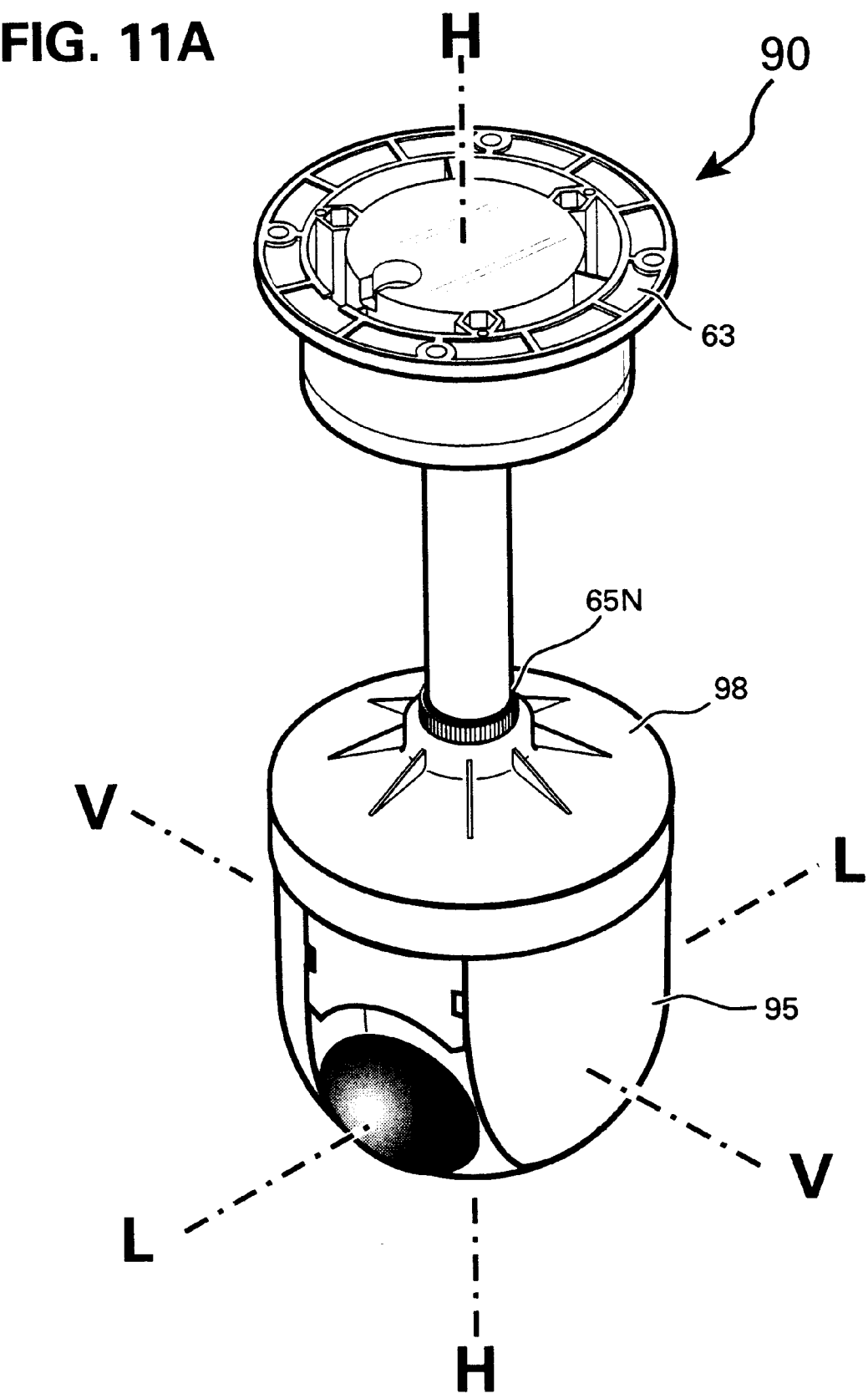
FIGS. 11A–11C show another perspective view and exploded view of the camera body shown in FIG. 10, enclosed in an outdoor cover and supported by a pipe.
Figure 11B:
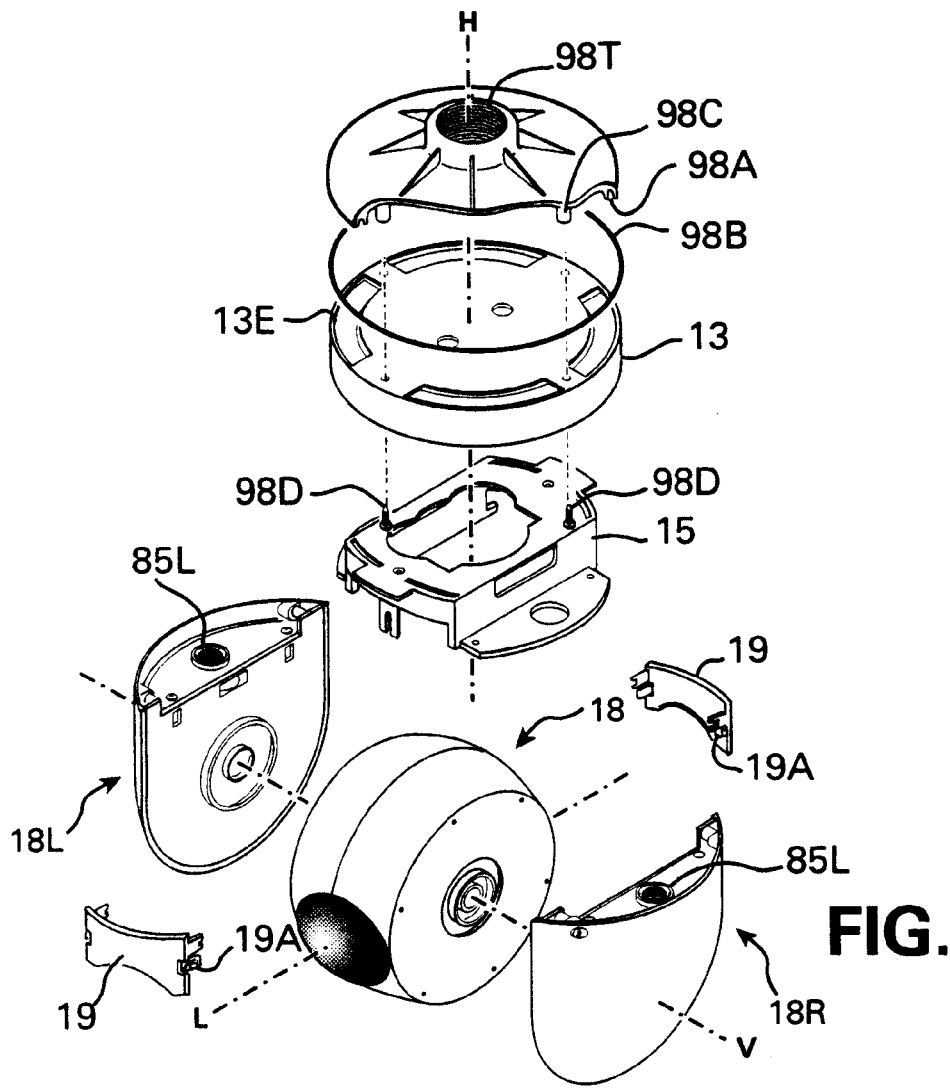
Figure 11C:
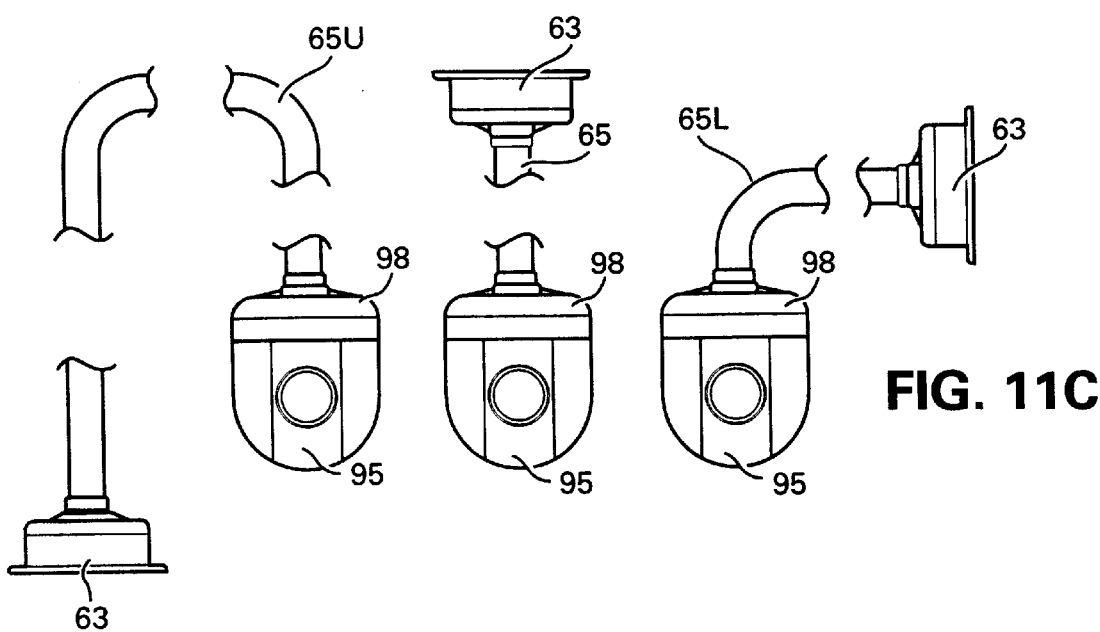

A television camera 90 of FIG. 11A–11C comprises a camera unit 95 which combines the camera unit 85 of FIG. 10 mounted onto the upper base 15 along with the base plate 13 of FIG. 3C and an outdoor cover 98, pipe 65 and flange assembly 63 and looks like a pendant mounted domed television camera having an oval or acorn shape.

The outdoor cover 98 having an outer diameter and a circumference identical to the diameter and circumference of the camera 85 of FIG. 10A comprises a groove 98A for enclosing an "O" ring seal 98B and four studs 98C for attaching the base plate 13 to the outdoor cover 98 using four screws 98D. Tightening of the screws 98D will pressure the "O" ring 98B between the outer rim 13E of the base plate 13 and the rim 98A of the outdoor cover 98 thereby sealing the entire surrounding of the outer cover 98.

The outdoor cover 98 further has an opening with a thread 98T at the center of its top end for pipe 65. The pipe 65 can be straight for a pendant mounting of the television camera 80 under horizontal structures or it can be formed or bent into L shape 65L or U shape 65U for mounting the television camera 80 the same way as the camera 60 is mounted.

The pipe 65 is threaded into the opening 88T using a well-known plumber's sealant tape to ensure that water will not leak into the television camera 90 in exactly the same manner the television camera 60 is mounted; however the fixedly positioned television camera 90 can be rotated about its horizontal axis H by rotating the outdoor cover 98 about the pipe 65 and counter locking the television camera 90 into position by the nut 65N. This makes the horizontal positioning setting method of the television camera 90 superfluous because the elongated segments 18L and 18R of the camera 95 are mounted onto the upper base 15 of the embodiment of FIGS. 3A–3C which can also be used for the horizontal positioning.

The camera 95 of FIG. 11B is identical in its structure to the camera having elongated segments 8L and 8R and the center segment 8 of FIG. 8A, with the exception of the cable inlets 85L. The camera comprises two "O" rings 70B for sealing the elongated segments 18L and 18R, an "O" ring 70C for sealing the center segment 18 and two oil seals 70E for sealing the rotating joints between the center segment 18 and the elongated segments 18L and 18R.

The setup of the center segment 18 supported by the left and right-hand elongated segments 18L and 18R which are attached fixedly to the upper base 15 instead of to the base assembly 81 of the camera 80 of FIG. 10 similarly ensures that water will not leak into the elongated segments 18L and 18R, nor to the center segment 18 or to the rotating joints between the elongated segments 18L and 18R and the center segment 18.

It becomes clear that the television camera 90 having a shape of an acorn and comprising the camera 95 mounted onto the upper base 15 and the base plate 13 and outdoor cover 98 supported by pipe 65 and flange assembly 63 can be mounted outdoors exposed to rain or snow and that water will not leak into the camera, the pipe or the flange assembly.

Figure 12:
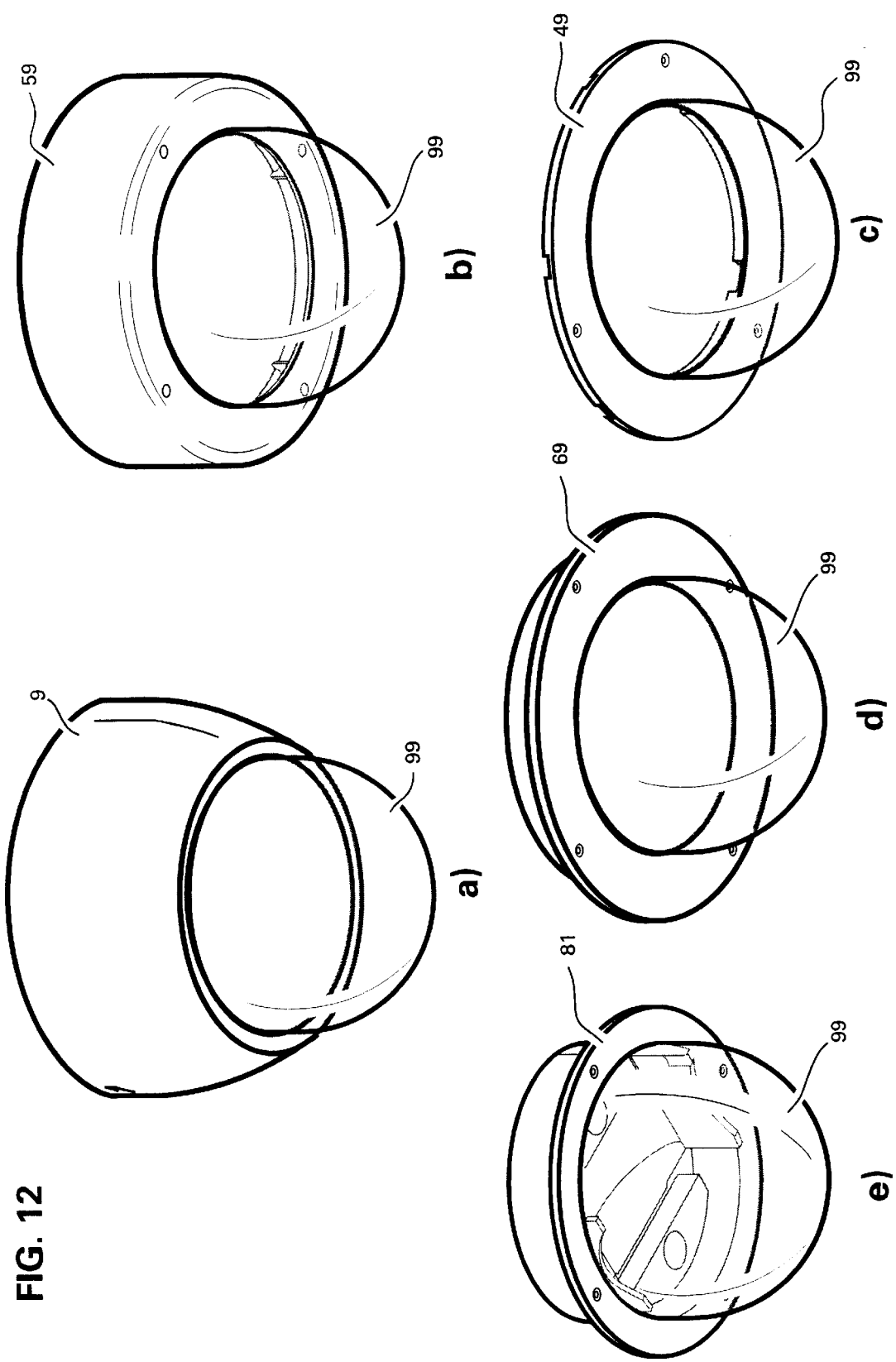
FIGS. 12(a–e) respectively show perspective views of different dome-shaped covers for covering the cameras of FIG. 1, FIG. 7, FIG. 8, FIG. 9 and FIG. 10.

Shown in FIGS. 12(a–e) are clear, tinted or semitransparent dome covers 99 attached to the cover 9 of FIGS. 1A–1B as shown in 12a, to the circular cover 49 of FIG. 7 as shown in FIG. 12c, to the cover 59 of FIG. 8 as shown in FIG. 12b, to the circular cover 69 of FIG. 9 as shown in FIG. 12d and to the base assembly 81 of FIG. 10 as shown in FIG. 12e. The hemispherical dome covers 99 having their center core intersect with the center core of the television cameras 1, 40, 50, 60 and 80 are attached by means of bonding or supersonic welding to the covers, circular covers or to the base assembly or the hemispherical dome cover and the covers may be made by injection molding to form a single molded part. In cases when the dome cover 99 with the cover 9 or 59, or the dome cover 99 with the circular covers 49 and 69 or the dome cover 99 with the base assembly 81 are attached to the television cameras 1, 40, 50, 60 and 80 instead of the covers, circular covers or the base assembly the television cameras will look like well-known hemispherical covered dome cameras.

It will of course, be understood by those skilled in the art that the particular embodiment of the invention here presented is by way of illustration only, and is meant to be in no way restrictive, therefore, numerous changes and modifications may be made, and the full use of equivalents resorted to, without departing from the spirit or scope of the invention as outlined in the appended claims.

What is claimed is:

1. A television camera comprising a picture pickup element and a lens enclosed in a cylindrical body with a hemispherical bottom and a flat top which have a platform and attachment means for said cylindrical body, wherein diameters of said cylindrical body and said hemispherical bottom are equal so as to provide for said cylindrical body to be rotatable about a first axis which is a central axis along the length of said cylindrical body and said lens is rotatable about a second axis of said hemispherical bottom which is orthogonal to said first axis and to a third axis which is an axis of said lens and wherein said first axis, said second axis and said third axis intersect at a center of said cylindrical body and said hemispherical bottom, the television camera further comprising:

two antipodal segments and a center segment forming said cylindrical body, said antipodal segments being fixedly attached to said platform and having chord planes parallel to each other; pivot joint means positioned at a center of said hemispherical bottom along said second axis and supported by said chord planes of said two antipodal segments; and said center segment being positioned between said chord planes of said antipodal segments and having a substantially spheric body having a diameter equal to a diameter of said cylindrical body and a shape of an arcuated drum having planes parallel to each other and a thickness slightly smaller than a distance between said chord planes of said antipodal segments and including complementary joints at the center of said planes for mounting said center segment onto said pivot joint means so as to make said center segment rotatable about said second axis, wherein said center segment contains said lens and said picture pickup element and a lens pane having a curvative surface of a diameter equal to said diameter of said spheric body and wherein said lens is positioned toward said lens pane along said third axis; said center segment including two center segment covers each having a curved surface having a curve of a diameter equal to said diameter of said cylindrical body, said two center segment covers having a width equal to said thickness of said arcuated drum for attachment to said platform for covering two opposite portions on two sides of said cylindrical body extending between said flat top and said hemispherical bottom and between said two antipodal segments, and wherein said attachment means is structured to provide an attachment of said television camera to one of a camera mount and a base which are to be fixedly attached to a supporting structure selected from a ceiling or a wall and to allow said cylindrical body to be rotatable about said first axis.

2. The television camera according to claim 1, wherein said platform comprises an electric panning motor and a slip ring assembly mounted inside a center shaft of said panning motor and with said center shaft and said slip ring assembly aligned with said first axis for rotating said cylindrical body with said slip ring assembly about said first axis, and wherein a body of said panning motor is attached to said platform and said center shaft is used for attaching said cylindrical body to said camera mount.

3. The television camera according to claim 2 wherein each of said antipodal segments has an interior space and comprises a side holder, a side cover, and a seal surrounding the interior space enclosed between a rim of said side holder and said side cover for sealing said interior space, and said center segment has an interior space and comprises two part covers, and a seal surrounding said interior space of said center segments, enclosed between a rim of said two part covers for sealing said interior space of said center segment, and wherein each said side holder and each of said two part covers comprises a ring surrounding said pivot joint means and enclosing an oil seal to seal said pivot joint means, and said platform has a platform interior space and further comprises a body, a top cover and a seal surrounding said platform interior space enclosed between a rim of said top cover and said body for sealing said platform, thereby sealing all interior spaces and said pivot joint means of said television camera.

4. The television camera according to claim 3, and further comprising a cup-shaped interface camera mount including a sealing groove around an outer rim thereof enclosing a seal for sealing said interface camera mount, a set of first electrical contacts attached to an outer surface of said interface camera mount and electrically connected to a set of second electrical contacts attached to an upper inner surface of said interface camera mount, a set of protruding convexes and a set of arms for latching and bolting said interface camera mount to a base, and said slip ring assembly further comprising a printed circuit board with a set of conductive layered terminals aligned to coincide with said second electrical contacts and with a set of screw holes of said center shaft, wherein said television camera is fastened to said interface camera mount using a set of screws through said screw holes which also attach and fasten said second electrical contacts to said layered terminals, thereby providing electrical connections between said slip ring and said first electrical contacts, while said television camera is rotatable inside said interface camera mount and wherein said upper inner surface and said top cover each comprise a ring for enclosing an oil seal for sealing said rotating joint comprising said center shaft along with said printed circuit board and said second electrical contacts.

5. The television camera according to claim 4, and further comprising an outdoor base for attaching said interface camera mount onto ceilings or onto other horizontal planes, said outdoor base comprising an outdoor rim with a groove enclosing a seal around the groove, a set of self lock hooks complementary to said protruding convexes, a set of studs complementary to said arms, a set of complementary electrical brushes for electrically connecting said first electrical contacts and a set of electrical terminals for connecting said electrical brushes to an electrical cable thereby completing electrical connections from the cable to said slip ring assembly, a cable inlet consisting of a cable grommet seal and a locking nut for fastening said grommet seal around said cable, wherein said cable can be fed through the rear of said outdoor base behind said cable inlet or through a cutout in a side wall of said outdoor base, and an outdoor cover including two complementary rims, a first rim complementary to said outdoor rim and a second rim complementary to said sealing groove around the outer rim of said interface camera mount, so that when said outdoor cover is attached to said outdoor base interior spaces between said outdoor base and said interface camera mount and said outdoor cover are sealed and said television camera appears as a sealed dome-shaped television camera for outdoor installation.

6. The television camera according to claim 5, wherein said outdoor cover is attached to one of a clear, tinted and semitransparent hemispherical dome cover and wherein a center core of said dome cover corresponds to a center core of said hemispherical bottom.

7. The television camera according to claim 4, and further comprising a pendant mount including an acorn cup-shaped cover for mounting said television camera onto a pipe with a seal, a nut for locking a position of said acorn cup-shaped cover to said pipe relative said first axis, a flange with a seal for attaching said pipe onto a ceiling or under another horizontal structure, and a pendant base attached into said acorn cup-shaped cover and including an outer rim and a seal enclosed around said outer rim for sealing surrounds of said acorn cup-shaped cover, said pendant base further including an inner rim with a groove enclosing a seal for sealing the interior of said pendant base, a set of self-lock hooks complementary to said protruding convexes, a set of studs complementary to said arms, a set of complementary electrical brushes for electrically connecting said first electrical contacts and a set of electrical terminals for connecting said electrical brushes to an electrical cable fed through said pipe, thereby completing electrical connections of a cable to said slip ring assembly, and a pendant bottom cover having two complementary rims, a first rim complementary to said outer rim and a second rim complementary to said sealing groove surrounding said interface camera mount, wherein when said pendant bottom cover is attached to said pendant base interior spaces between said pendant base and said camera mount are sealed.

8. The television camera according to claim 7, wherein said pipe is bent into L shape and said flange is used for mounting said pipe onto a wall or other vertical structure.

9. The television camera according to claim 7, wherein said pendant bottom cover is attached to one of a clear, tinted or semitransparent hemispherical dome cover and wherein a center core of said dome cover corresponds to a center core of said hemispherical bottom.

10. The television camera according to claim 7, wherein said pipe is bent into U-shape and said flange is used for mounting said pipe on top of a pole or on top of a horizontal plane or structure.

11. The television camera according to claim 2, and further comprising a cup-shaped interface camera mount including a set of first electrical contacts attached to an outer surface of said interface camera mount and electrically connected to a set of second electrical contacts attached to an upper inner surface of said interface camera mount, a set of protruding convexes and a set of arms for latching and bolting said interface camera mount to a base, and said slip ring assembly further comprising a printed circuit board with a set of conductive layered terminals aligned to coincide with said second electrical contacts and with a set of screw holes of said center shaft, wherein said television camera is fastened to said interface camera mount using a set of screws through said screw holes which also attach and fasten said second electrical contacts to said layered terminals, thereby providing electrical connections between said slip ring and said first electrical contacts, while said television camera is rotatable inside said interface camera mount.

12. The television camera according to claim 11, and further comprising a flat base for attaching said interface camera mount onto ceilings or onto other horizontal planes, said flat base including a set of self-lock hooks complementary to said protruding convexes, a set of studs complementary to said arms, a set of complementary electrical brushes for electrically connecting said first electrical contacts and a set of electrical terminals for connecting said electrical brushes to an electrical cable thereby completing the electrical connections from the cable to said slip ring assembly and an indoor cover to cover said flat base along with said interface camera mount so as to render said television camera to appear as a dome covered television camera.

13. The television camera according to claim 12, wherein said indoor cover is attached to one of a clear, tinted and semitransparent hemispherical dome cover and wherein a center core of said dome cover corresponds to a center core of said hemispherical bottom.

14. The television camera according to claim 11, and further comprising a concaved base for attaching said interface camera mount onto a layer of a drop ceiling having a surrounding underceiling rim and a set of latches for attaching said concaved base to a cutout in the drop ceiling and vising said layer of the drop ceiling between said underceiling rim and said latches, and a set of self-lock hooks complementary to said protruding convexes, a set of studs complementary to said arms, a set of complementary electrical brushes for electrically connecting said first electrical contacts and a set of electrical terminals for connecting said electrical brushes to an electrical cable thereby completing electrical connections from the cable to said slip ring assembly, and a ring-shaped cover to cover a portion of said underceiling rim along with said interface camera mount so as to render said television camera to appear as a dome covered television camera mounted onto the drop ceiling.

15. The television camera according to claim 14, wherein said ring-shaped cover is attached to one of a clear, tinted and semitransparent hemispherical dome cover and wherein a center core of said dome cover corresponds to a center core of said hemispherical bottom.

16. The television camera according to claim 11, and further comprising a pendant mount including an acorn cup-shaped cover for mounting said television camera onto a pipe, a nut for locking a position of said acorn cup-shaped cover to said pipe relative to said first axis, and a flange for attaching said pipe onto a ceiling or under another horizontal structure and a pendant base attached into said acorn cup-shaped cover and including an outer rim that matches a bottom rim of said acorn cup-shaped cover, a set of self-lock hooks complementary to said protruding convexes, a set of studs complementary to said arms, a set of complementary electrical brushes for electrically connecting said first electrical contacts and a set of electrical terminals for connecting said electrical brushes to an electrical cable fed through said pipe, thereby completing electrical connections from the cable to said slip ring assembly and a pendant bottom cover for covering said pendant base.

17. The television camera according to claim 16, wherein said pipe is bent into L shape and said flange is used for mounting said pipe onto a wall or other vertical structure.

18. The television camera according to claim 16, wherein said pendant bottom cover is attached to one of a clear, tinted and semitransparent hemispherical dome cover and wherein a center core of said dome cover corresponds to a center core of said hemispherical bottom.

19. The television camera according to claim 16, wherein said pipe is bent into U-shape and said flange is used for mounting said pipe on top of a pole or on top of a horizontal plane or structure.

20. The television camera according to claim 2, and further comprising a recessed wall mount for mounting said television camera on a vertical structure with a half of said cylindrical body being recessed into said vertical structure, said recessed wall mount including a recessed mounting box, a cutout for allowing said cylindrical body to be recessed into said mounting box, a wall top holder including a set of electrical terminals connected to a set of electrical contacts attached to a bottom surface of said wall top holder, and said slip ring assembly further comprising a printed circuit board with a set of conductive layered terminals aligned to coincide with said electrical contacts and with a set of screw holes of said center shaft, wherein said television camera is fastened to said wall top holder using a set of screws through said screw holes which also attach and fasten said electrical contacts to said layered terminals, thereby providing electrical connections between said slip ring and said electrical terminals, wherein said top holder is orthogonally attached to said recessed wall mount with a half of said cylindrical body protruding from the surface of said recessed wall mount and said cylindrical body is rotatable about said first axis inside said cutout, and a half circle top cover for covering said wall top holder and said terminal connections.

21. The television camera according to claim 2, and further comprising a semi-recessed wall mount for mounting said television camera on a vertical structure with less than a half of said cylindrical body being recessed into said vertical structure, said semi-recessed wall mount including a recessed mounting box, a cutout for allowing a portion of said cylindrical body to be recessed into said mounting box, a wall top holder including a set of electrical terminals connected to a set of electrical contacts attached to a bottom surface of said wall top holder, and said slip ring assembly further including a printed circuit board with a set of conductive layered terminals aligned to coincide with said electrical contacts and with a set of screw holes of said center shaft, wherein said television camera is fastened to said wall top holder using a set of screws through said screw holes which also attach and fasten said electrical contacts to said layered terminals, thereby providing electrical connections between said slip ring and said electrical terminals, wherein said top holder is orthogonally attached to said semi-recessed wall mount with more than a half of said cylindrical body protruding from the surface of said wall mount and said cylindrical body is 180° rotatable about said first axis without optically obstructing said lens pane and a partially elongated half circle top cover for covering the wall top holder and terminal connections.

22. The television camera according to claim 2, and further comprising a surface wall mount for mounting said television camera on a vertical structure having a hedge surrounding a space extending from an outer surface of said surface wall mount to a center line bisecting said cylindrical body with a cutout portion for preventing an optical obstruction to said lens pane, a wall top holder including a set of electrical terminals connected to a set of electrical contacts attached to the bottom surface of said wall top holder, and said slip ring assembly further including a printed circuit board with a set of conductive layered terminals aligned to coincide with said electrical contacts and with a set of screw holes of said center shaft, wherein said television camera is fastened to said wall top holder using a set of screws through said screw holes which also attach and fasten said electrical contacts to said layered terminals, thereby providing electrical connections between said slip ring and said electrical terminals, wherein said top holder is orthogonally attached to said surface wall mount with a half of said cylindrical body protruding from said hedge and said cylindrical body is 180° rotatable about said first axis inside said hedge without optically obstructing said lens pane and an elongated half circle top cover for covering the wall top holder and terminal connections.

23. The television camera according to claim 1, wherein said pivot joint means supported by a chord plane of one of said antipodal segments comprises an electric tilting motor having a center shaft attached to said center segment aligned with said second axis and a body of said tilting motor is attached to said one of said antipodal segments for rotating said center segment about said second axis.

24. The television camera according to claim 1 wherein each of said antipodal segments has an interior space and comprises a side holder having a rim, a side cover, and a seal surrounding the interior space enclosed between a rim of said side holder and said side cover for sealing said interior space, and said center segment has an interior space and comprises two part covers, and a seal surrounding said interior space of said center segment enclosed between a rim of said two part covers for sealing said interior space of said center segment, and wherein each said side holder and each of said two part covers comprises a ring surrounding said pivot joint means and encloses an oil seal to seal said pivot joint means, and said side holder of at least one of said antipodal segments further comprises a cable inlet including a cable grommet seal and a locking nut for fastening said grommet seal around a cable, thereby sealing all interior spaces, rotating joints and cable inlets of said television camera.

25. The television camera according to claim 24, wherein said television camera further comprises a disc-shaped camera mount having a diameter equal to the diameter of said cylindrical body for mounting said television camera onto ceilings or onto other horizontal planes and wherein said attachment means includes hooks and said disc-shaped camera mount has complementary cutouts and slits for sliding said hooks into said cutouts and throughout said slits for rotating said platform about said first axis, and said platform further includes a tongue and locking means having at least one screw for engaging said tongue against said center segment and a screw for engaging a rim of said platform, thereby providing mounting of said television camera onto said disc-shaped camera mount and locking said television camera to a set position about at least one of said first axis and said second axis.

26. The television camera according to claim 25, and further comprising a circular pendant attachment cover having a diameter equal to the diameter of said cylindrical body for mounting said television camera onto a pipe with a seal, a nut for locking a position of said pendant attachment cover to said pipe relative to said first axis, a flange with a seal for attaching said pipe onto a ceiling or under another horizontal structure, and a surrounding rim enclosing a seal for sealing surrounds of said disc-shaped camera mount and studs for attaching said disc-shaped camera mount to said pendant attachment cover, wherein a cable for connecting said television camera is fed through said pipe, thereby providing a sealed passage for the cable toward said cable inlet.

27. The television camera according to claim 26, wherein said pipe is bent into L shape and said flange is used for mounting said pipe onto a wall or other vertical structure.

28. The television camera according to claim 26, wherein said pendant attachment cover has a shape of a top cut of an acorn, rendering said television camera into a shape of an acorn.

29. The television camera according to claim 26, wherein said pipe is bent into U-shape and said flange is used for mounting said pipe on top of a pole or on top of a horizontal plane or structure.

30. The television camera according to claim 26, wherein said pipe is bent into U-shape and said flange is used for mounting said pipe on top of a pole or on top of a horizontal plane or structure.

31. The television camera according to claim 1, wherein said television camera further comprises a disc-shaped camera mount having a diameter equal to the diameter of said cylindrical body for mounting said television camera onto ceilings or onto other horizontal planes, and wherein said attachment means comprise hooks and said disc-shaped camera mount includes complementary cutouts and slits for sliding said hooks into said cutouts and throughout said slits for rotating said platform about said first axis, and said platform further comprises a tongue and locking means including at least one screw for engaging said tongue against said center segment and a screw for engaging a rim of said platform, thereby providing mounting of said television camera onto said disc-shaped camera mount and locking said television camera to a set position about at least one of said first axis and said second axis.

32. The television camera according to claim 31, and further comprising a recessed wall mount for mounting said television camera on a vertical structure with a half of said cylindrical body being recessed into said vertical structure, said wall mount including a recessed mounting box, a cutout for allowing said cylindrical body to be recessed into said mounting box and a wall top mount for orthogonally attaching said disc like-shaped camera mount to said recessed wall mount with a half of said cylindrical body protruding from the surface of said recessed wall mount and said cylindrical body being rotatable about said first axis inside said cutout, and a half circle top cover for covering said wall top mount.

33. The television camera according to claim 31, and further comprising a semi-recessed wall mount for mounting said television camera on a vertical structure with less than a half of said cylindrical body being recessed into said vertical structure, said semi-recessed wall mount including a recessed mounting box, a cutout for allowing a portion of said cylindrical body to be recessed into said mounting box and a wall top mount for orthogonally attaching said disc-shaped camera mount to said semi-recessed wall mount with more than half of said cylindrical body protruding from the surface of said wall mount and said cylindrical body being 180° rotatable about said first axis without optically obstructing said lens pane and a partially elongated half circle top cover for covering said wall top mount.

34. The television camera according to claim 31, and further comprising a surface wall mount for mounting said television camera on a vertical structure having a hedge for surrounding a space extending from an outer surface of said surface wall mount to a center line bisecting said cylindrical body with a cutout portion for preventing an optical obstruction to said lens pane and a wall top mount for orthogonally attaching said disc-shaped camera mount to said surface wall mount with a half of said cylindrical body protruding from said hedge and said cylindrical body being 180° rotatable about said first axis inside said hedge without optically obstructing said lens pane and an elongated half circle top cover for covering said wall top mount.

35. The television camera according to claim 31, and further comprising a circular pendant attachment cover having a diameter equal to the diameter of said cylindrical body for mounting said television camera onto a pipe, a nut for locking said pendant attachment cover position to said pipe about said first axis, a flange for attaching said pipe onto a ceiling or under another horizontal structure and studs for attaching said disc-shaped camera mount to said pendant attachment cover, wherein a cable for connecting said television camera is fed through said pipe.

36. The television camera according to claim 35, wherein said pipe is bent into L shape and said flange is used for mounting said pipe onto a wall or other vertical structure.

37. The television camera according to claim 35, wherein said pendant attachment cover has a shape of a top cut of an acorn nut, rendering said television camera into a shape of an acorn nut.

38. The television camera according to claim 1, and further comprising a pendant mount including an acorn cup-shaped cover for mounting said television camera onto a pipe with a seal, a nut for locking a position of said acorn cup-shaped cover to said pipe relative to said first axis, and a flange with a seal for attaching said pipe onto a ceiling or under another horizontal structure, wherein said platform is attached to said acorn cup-shaped cover and further including an outer rim and a seal enclosed around said outer rim for sealing surrounds of said acorn cup-shaped cover and wherein each of said antipodal segments has an interior space and includes a side holder, a side cover, and a seal surrounding the interior space enclosed between a rim of said side holder and said side cover for sealing said interior space, and said center segment has an interior space and includes two part covers, and a seal surrounding said interior space of said center segment enclosed between a rim of said two part covers for sealing said interior space of said center segment, and wherein each said side holder and each of said two part covers includes a ring surrounding said pivot joint means and encloses an oil seal to seal said pivot joint means, and wherein a cable for connecting said television camera is fed through said pipe thereby providing a sealed passage for the cable to sealed interior spaces of said television camera.

39. The television camera according to claim 38, wherein said pipe is bent into L shape and said flange is used for mounting said pipe onto a wall or other vertical structure.

40. The television camera according to claim 38, wherein said rim of said platform is attached to one of a clear, tinted and semitransparent hemispherical dome cover and wherein a center core of said dome cover corresponds to a center core of said hemispherical bottom.

41. The television camera according to claim 38, wherein said pipe is bent into U-shape and said flange is used for mounting said pipe on top of a pole or on top of a horizontal plane or structure.

42. The television camera according to claim 1, and further comprising a pendant mount including an acorn cup-shaped cover for mounting said television camera onto a pipe, a nut for locking a position of said acorn cup-shaped cover to said pipe relative to said first axis, and a flange for attaching said pipe onto a ceiling or under another horizontal structure, wherein said platform is attached into said acorn cup like cover and further includes an outer rim that matches a bottom rim of said acorn cup-shaped cover and wherein an electrical cable for connecting said television camera is fed through said pipe.

43. The television camera according to claim 42, wherein said pipe is bent into L shape and said flange is used for mounting said pipe onto a wall or another vertical structure.

44. The television camera according to claim 42, wherein said rim of said platform is attached to one of a clear, tinted and semitransparent hemispherical dome cover and wherein a center core of said dome cover corresponds to a center core of said hemispherical bottom.

45. The television camera according to claim 42, wherein said pipe is bent into U-shape and said flange is used for mounting said pipe on top of a pole or on top of a horizontal plane or structure.

46. A flange assembly for supporting a pendant-mounted television camera comprising a base to be attached to a vertical plane or structure or to a top of or under a horizontal plane or structure an interconnection means positioned in an interior cavity of said base for connecting a cable to said television camera, a cover for attaching a pipe with a seal for supporting said pendant-mounted television camera and for feeding said cable to said television camera, a seal extended between rims of said base and said cover for sealing said interior cavity, and a cable inlet for providing a passage for a cable to said interior cavity, said cable inlet including a cable grommet seal and a locking nut for fastening said grommet seal around said cable, thereby maintaining said interior cavity sealed, and wherein said cable can be fed through the rear of said base behind said cable inlet or through a cutout in a side wall of said base.

\* \* \* \* \*